Figure 1:
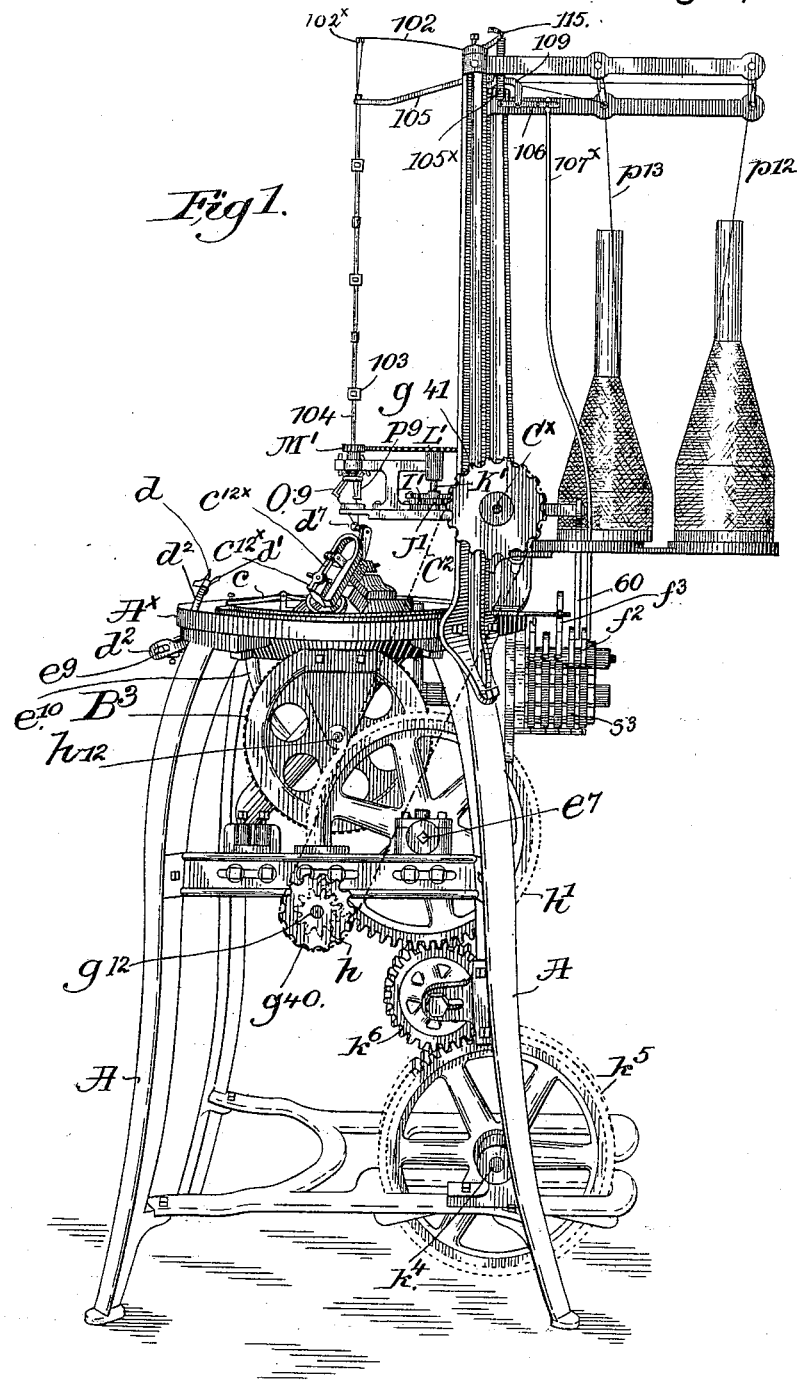

(No Model.)　　　　　　　R. W. KING.　　　　22 Sheets—Sheet 1.
KNITTING MACHINE.

No. 479,986.　　　　　　　　　Patented Aug. 2, 1892.

Witnesses.　　　　　　　　　　　Inventor:
J. Edw. Maybee　　　　　　　　　Robt. W. King
H. G. McMillan　　　　　　　　by Donald C. Ridout & Co.
　　　　　　　　　　　　　　　　　Attys.

(No Model.) 22 Sheets—Sheet 3.
R. W. KING.
KNITTING MACHINE.

No. 479,986. Patented Aug. 2, 1892.

Witnesses.
J. Edw. Maybee
W. G. McMillan

Inventor:
Robt. W. King
by Donald C. Ridout & Co.
Attys.

(No Model.)  
22 Sheets—Sheet 5.
R. W. KING.
KNITTING MACHINE.
No. 479,986. Patented Aug. 2, 1892.
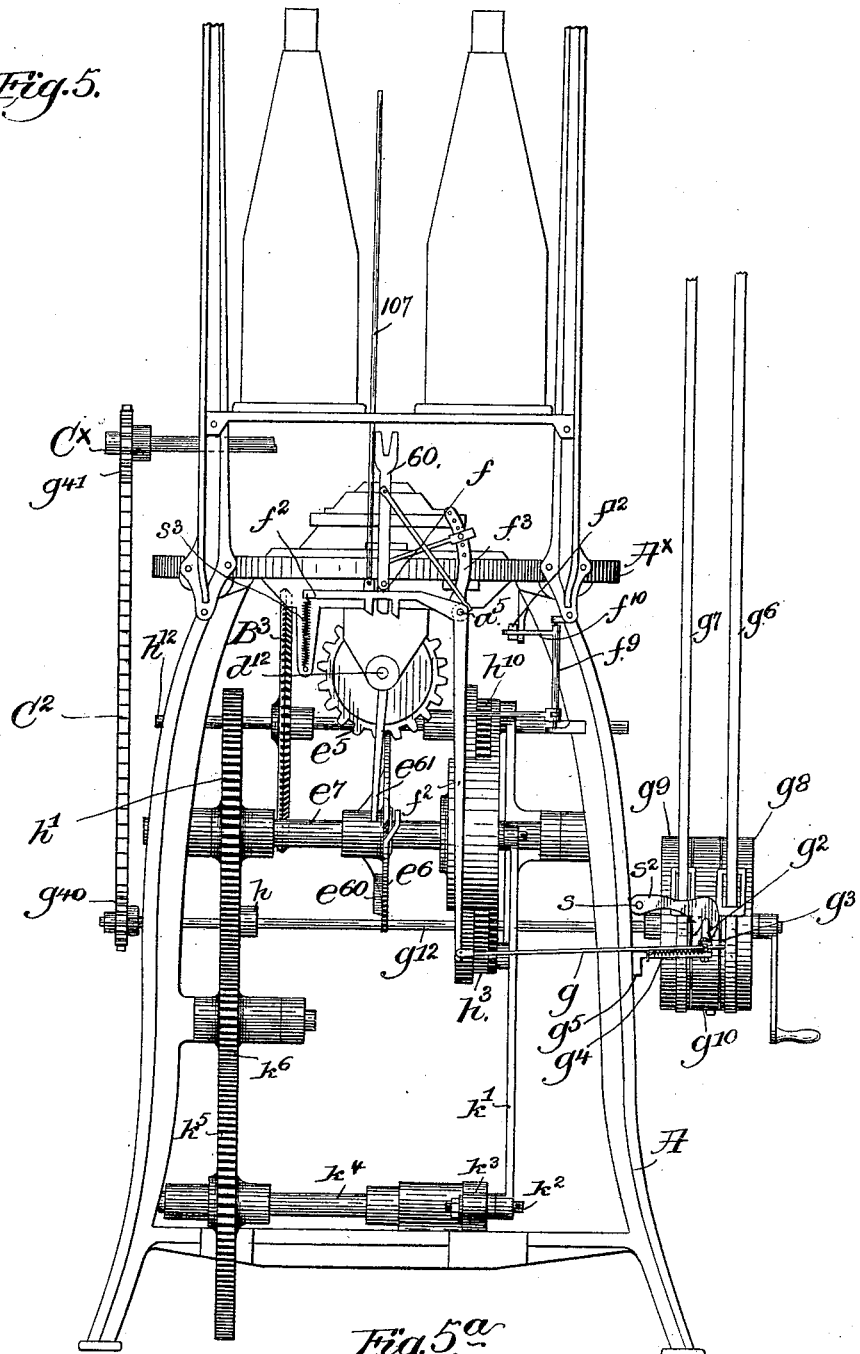
Fig. 5.
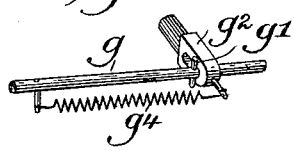
Fig. 5ª.
Witnesses:  
J. Edw. Maybee  
W. G. McMillan
Inventor:  
Robt. W. King  
by Donald C. Ridout & Co.  
attys.

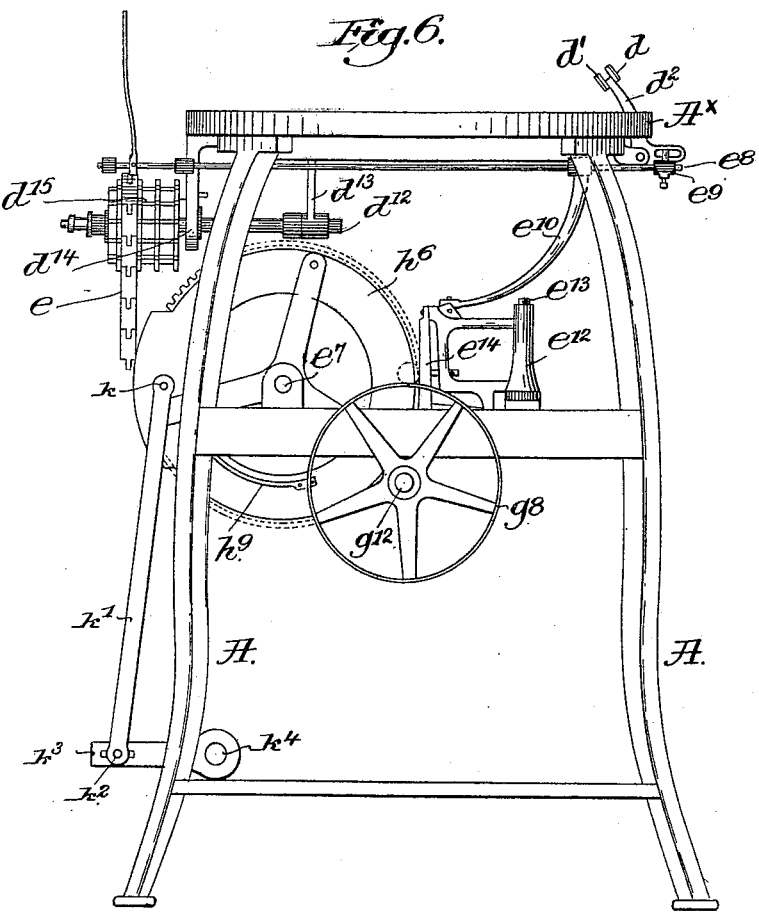

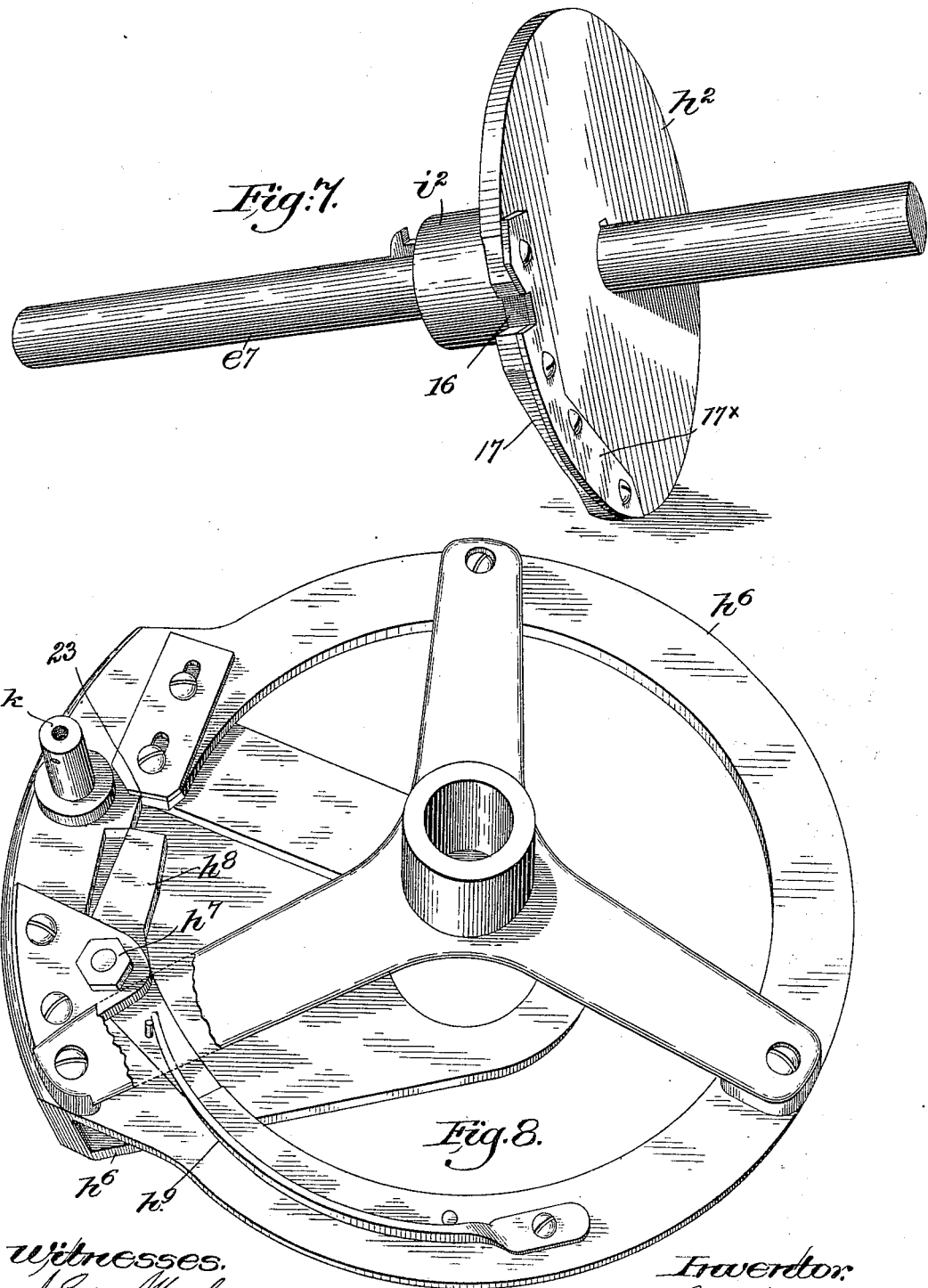

(No Model.)  22 Sheets—Sheet 8.

R. W. KING.
KNITTING MACHINE.

No. 479,986.  Patented Aug. 2, 1892.

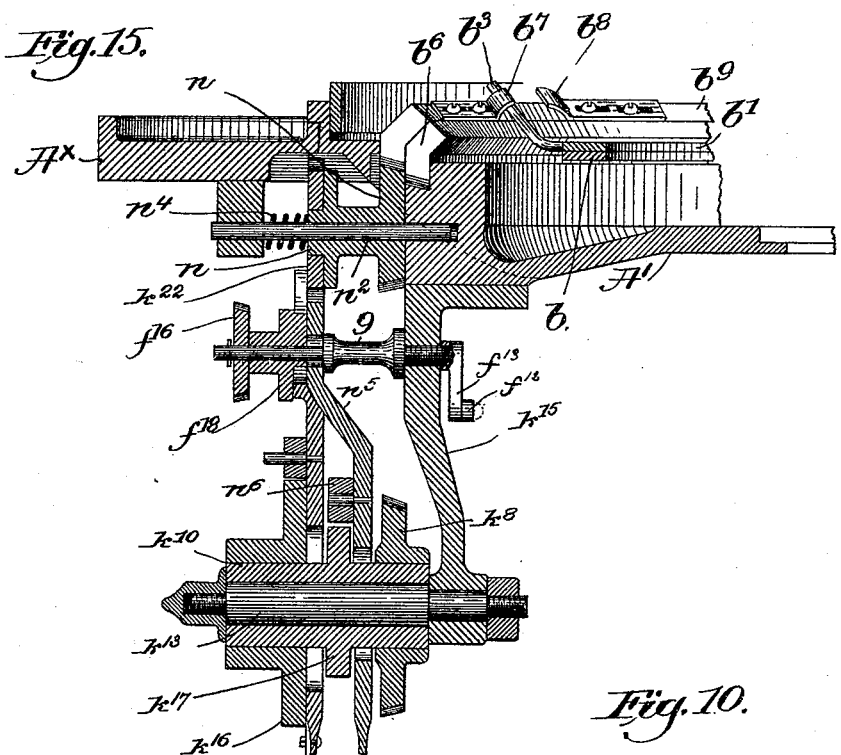
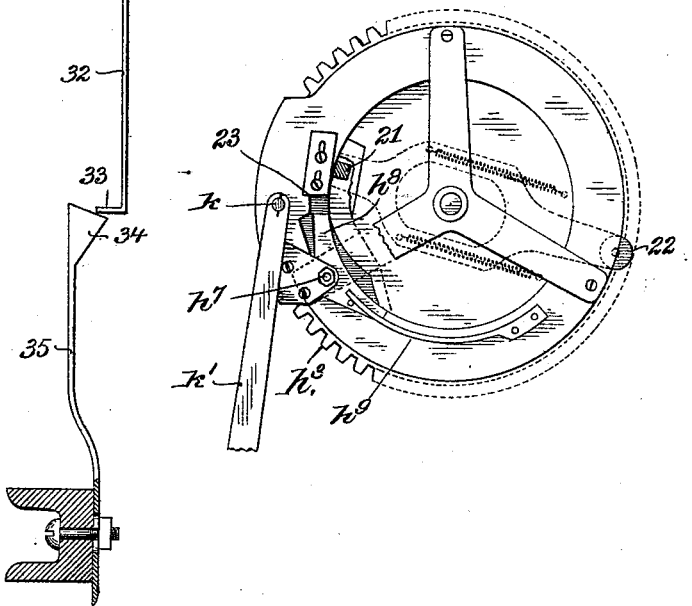

(No Model.) 22 Sheets—Sheet 10.
R. W. KING.
KNITTING MACHINE.
No. 479,986. Patented Aug. 2, 1892.
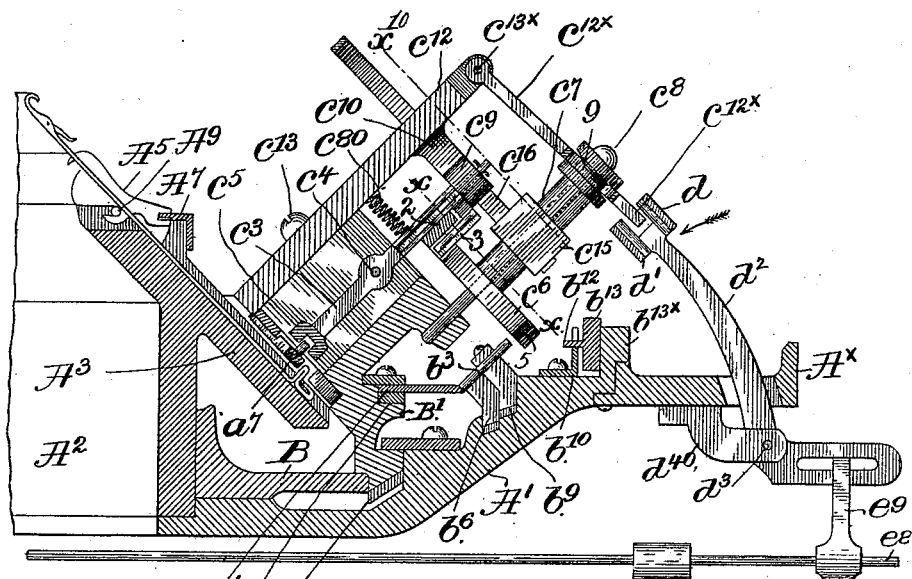
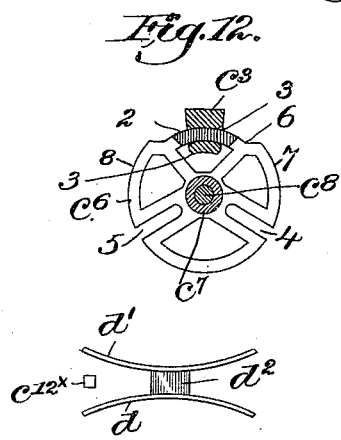
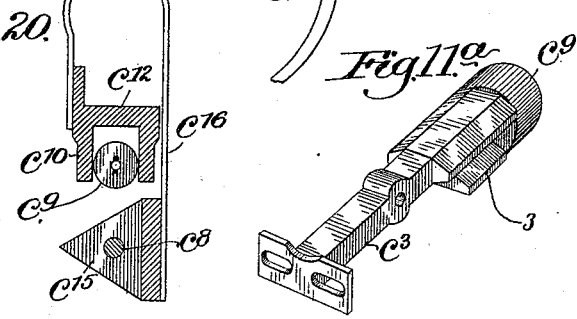
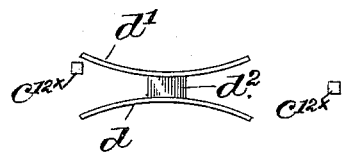

(No Model.)

R. W. KING.
KNITTING MACHINE.

No. 479,986. Patented Aug. 2, 1892.

22 Sheets—Sheet 11.

Witnesses.
J. Edw. Maybee
W. G. McMillan

Inventor:
Robt. W. King
by Donald C. Ridout & Co.
Attys.

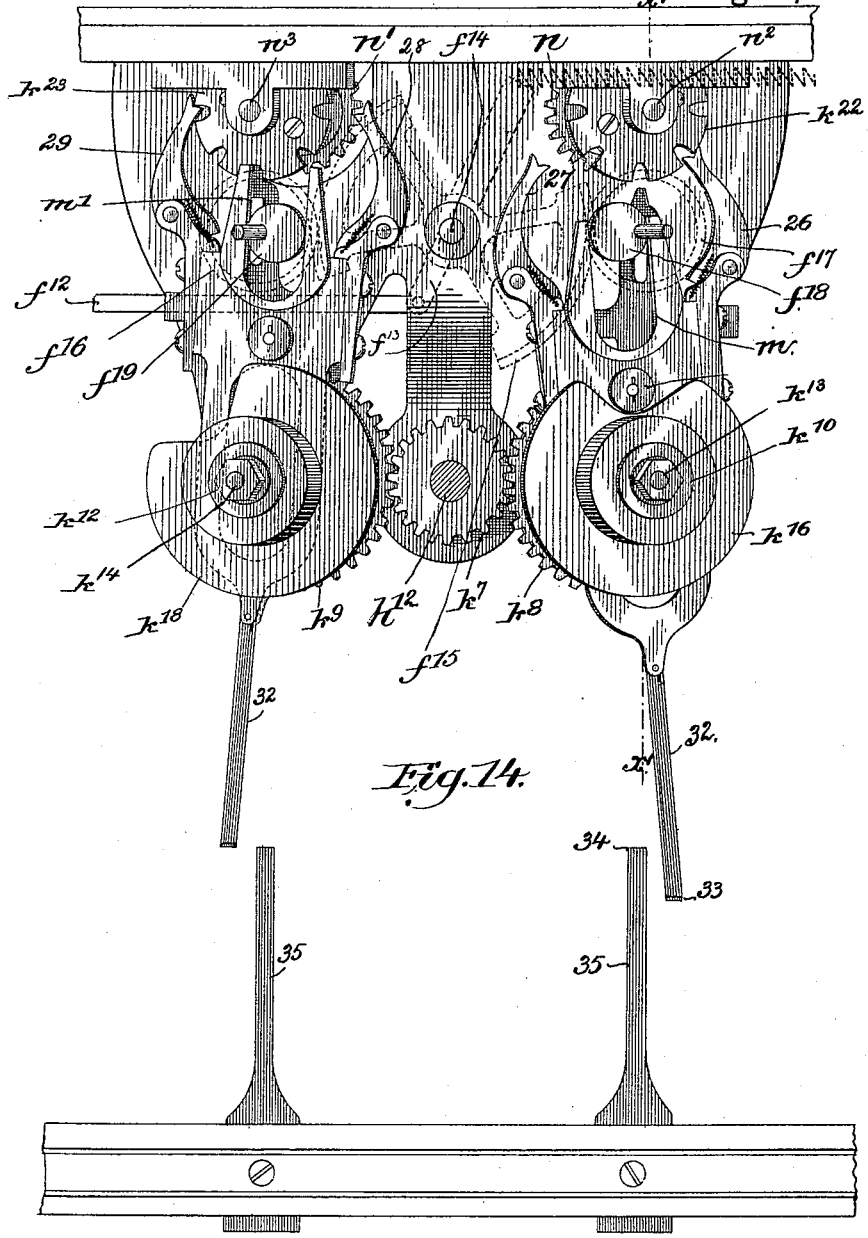

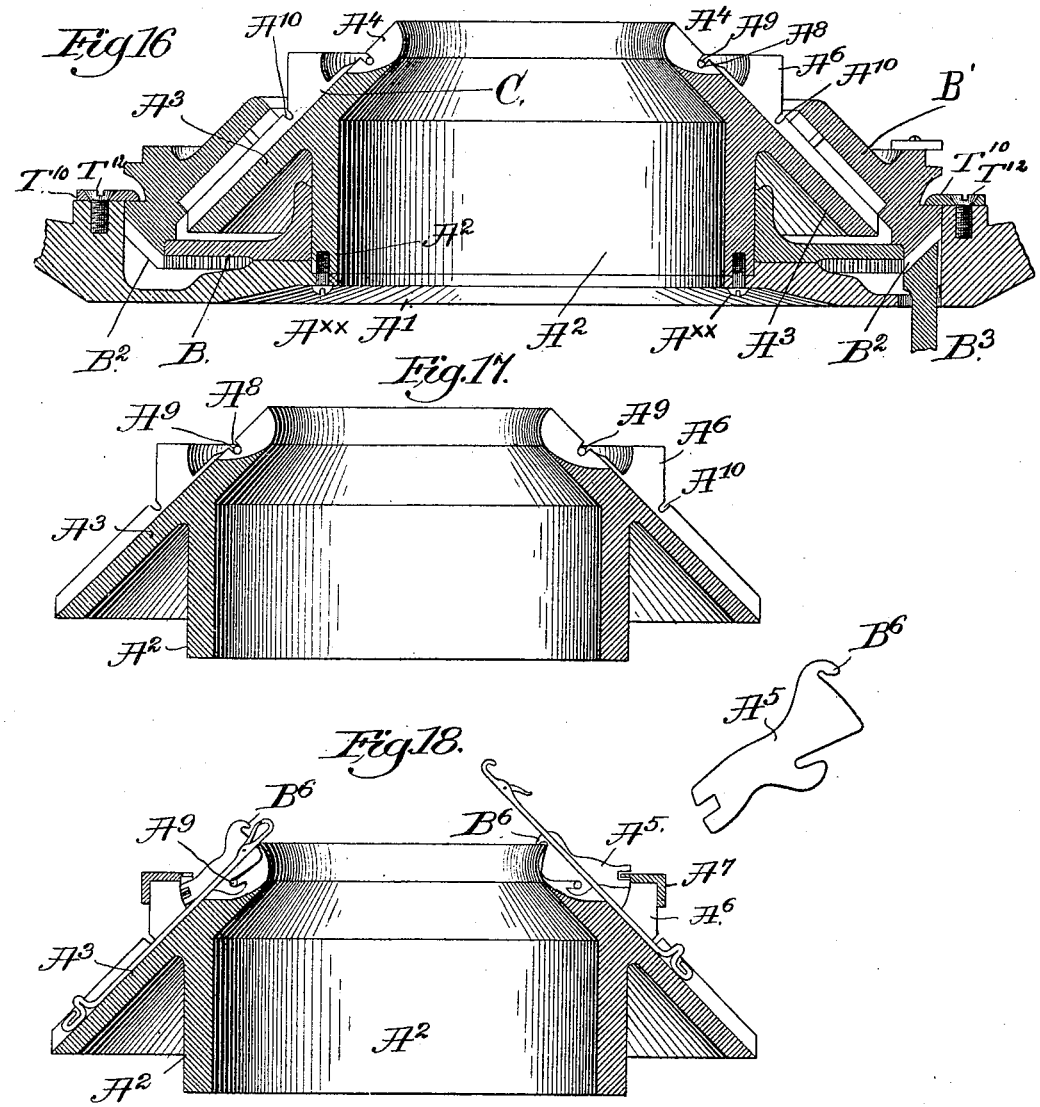

(No Model.)  
R. W. KING.  
KNITTING MACHINE.  
No. 479,986. Patented Aug. 2, 1892.
22 Sheets—Sheet 14.
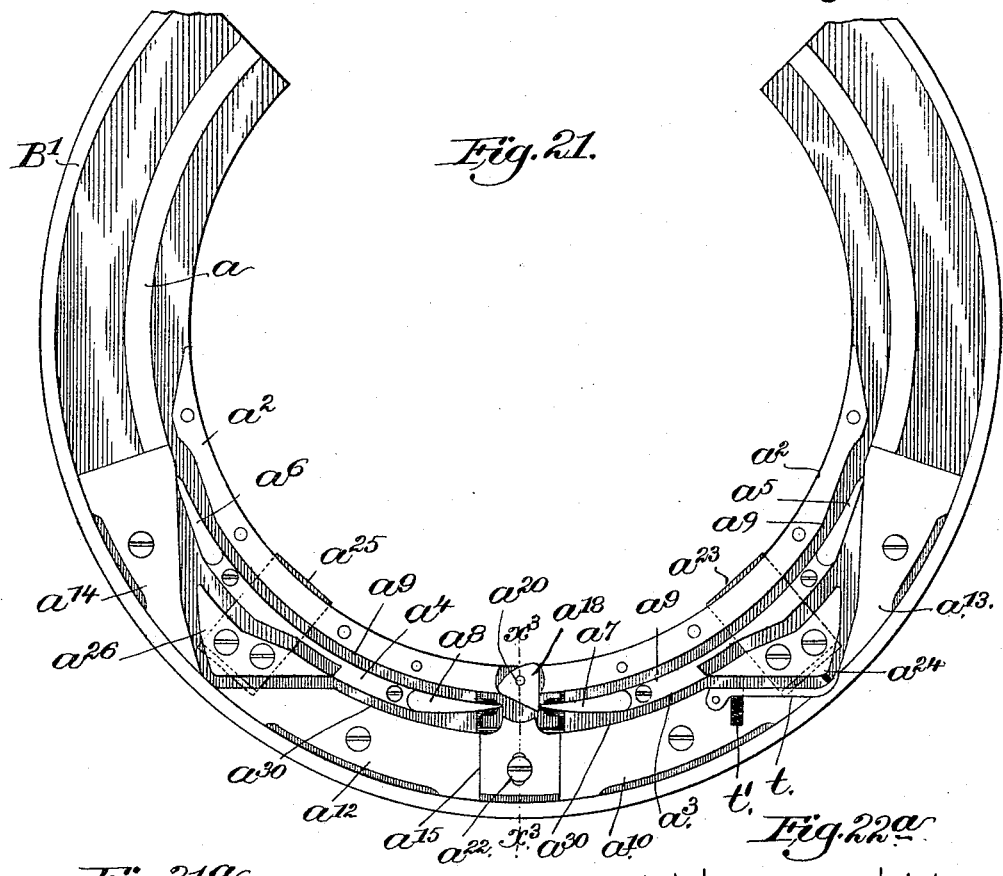
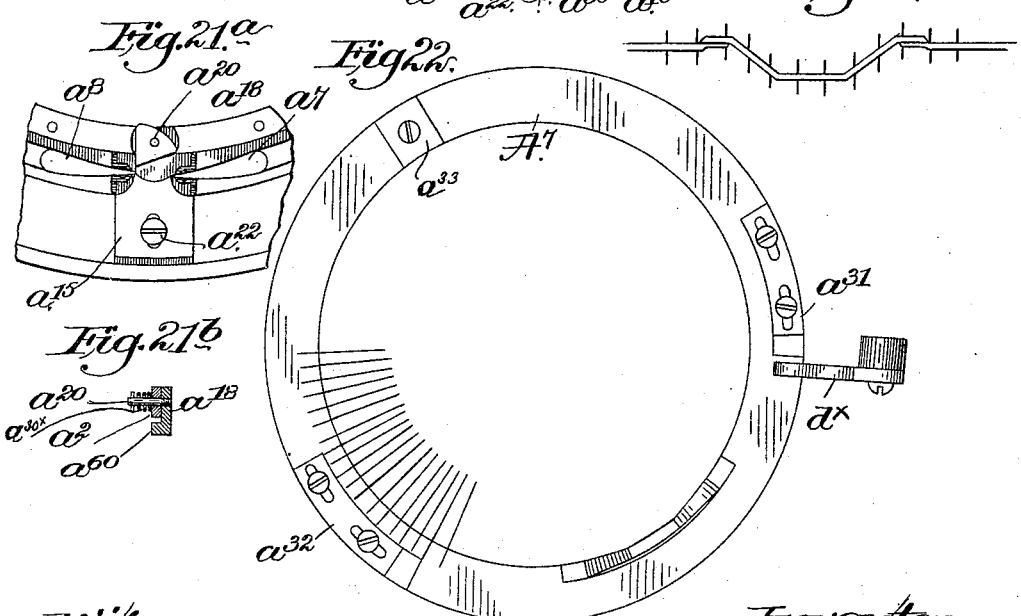
Witnesses.  
J. Edw. Maybee  
H. G. McMillan
Inventor:  
Robt. W. King  
by Donald C. Ridout & Co  
attys.

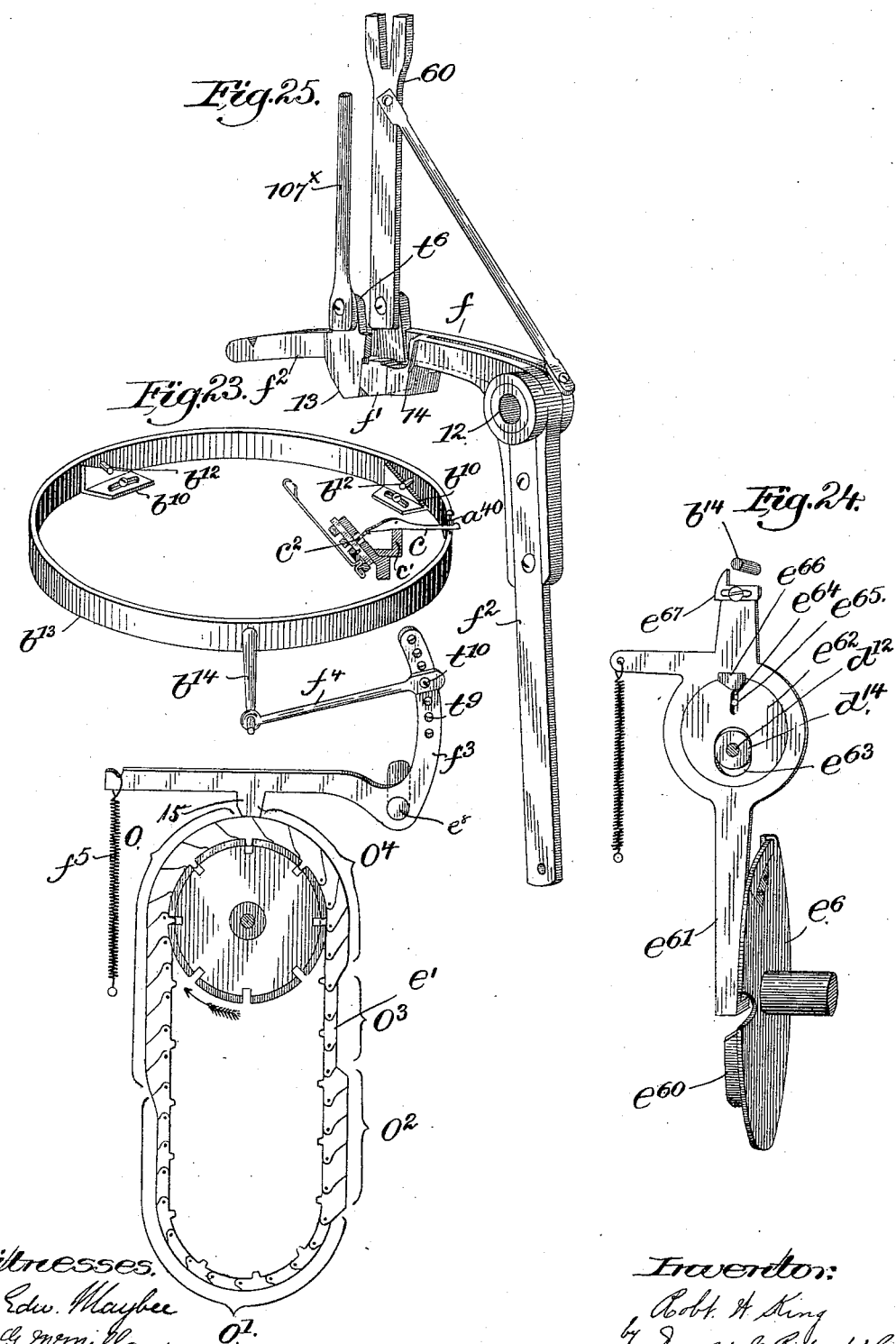

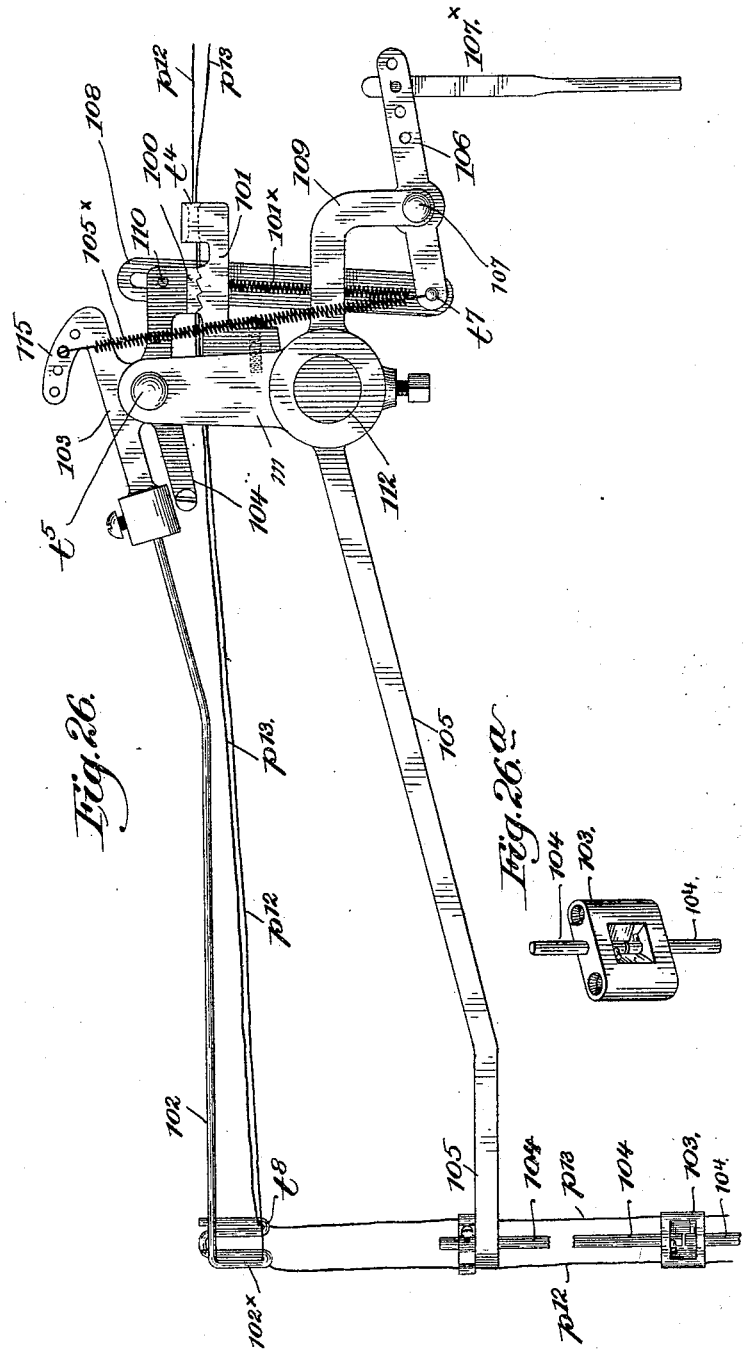

(No Model.) 22 Sheets—Sheet 17.
R. W. KING.
KNITTING MACHINE.
No. 479,986. Patented Aug. 2, 1892.
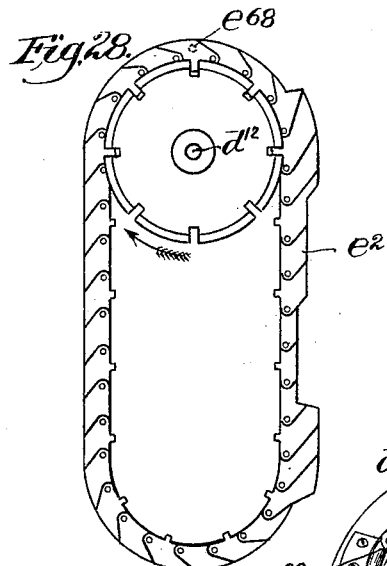
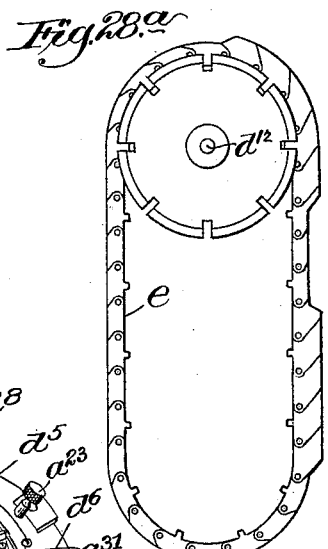
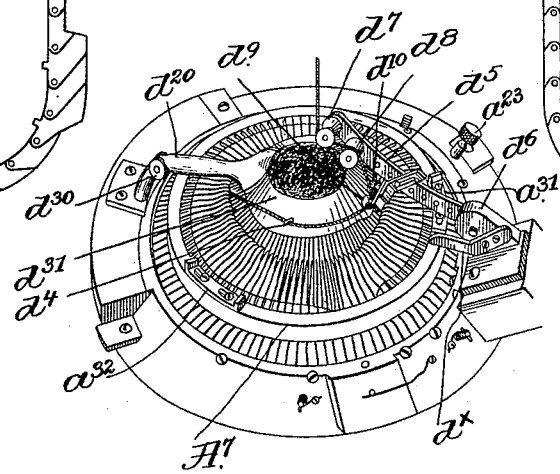
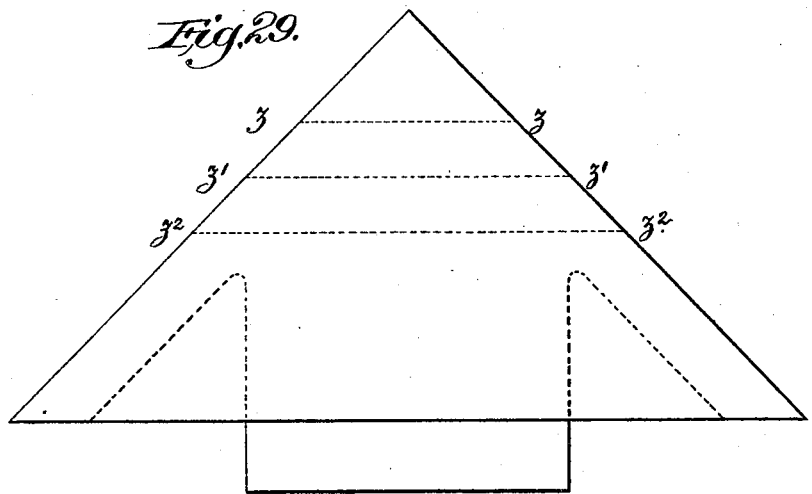
Witnesses.
J. Edw. Maybee
W. G. McMillan
Inventor:
Robt. W. King
by Donald C. Ridout & Co.
Attys.

(No Model.)
R. W. KING.
KNITTING MACHINE.
No. 479,986. Patented Aug. 2, 1892.
22 Sheets—Sheet 18.
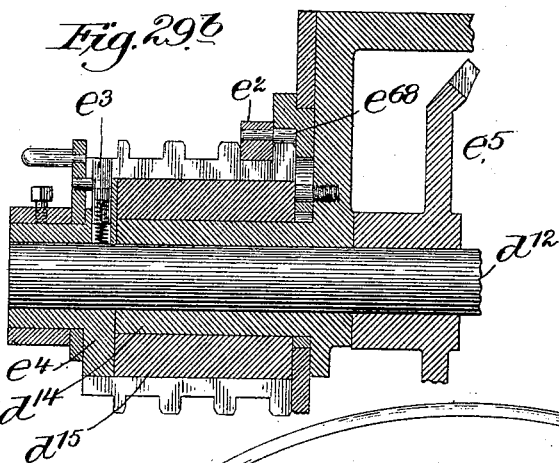
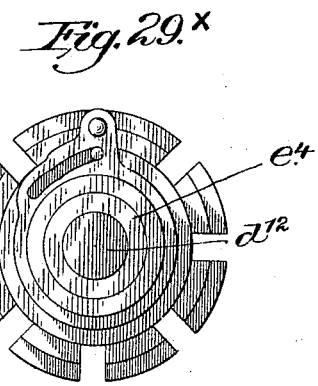
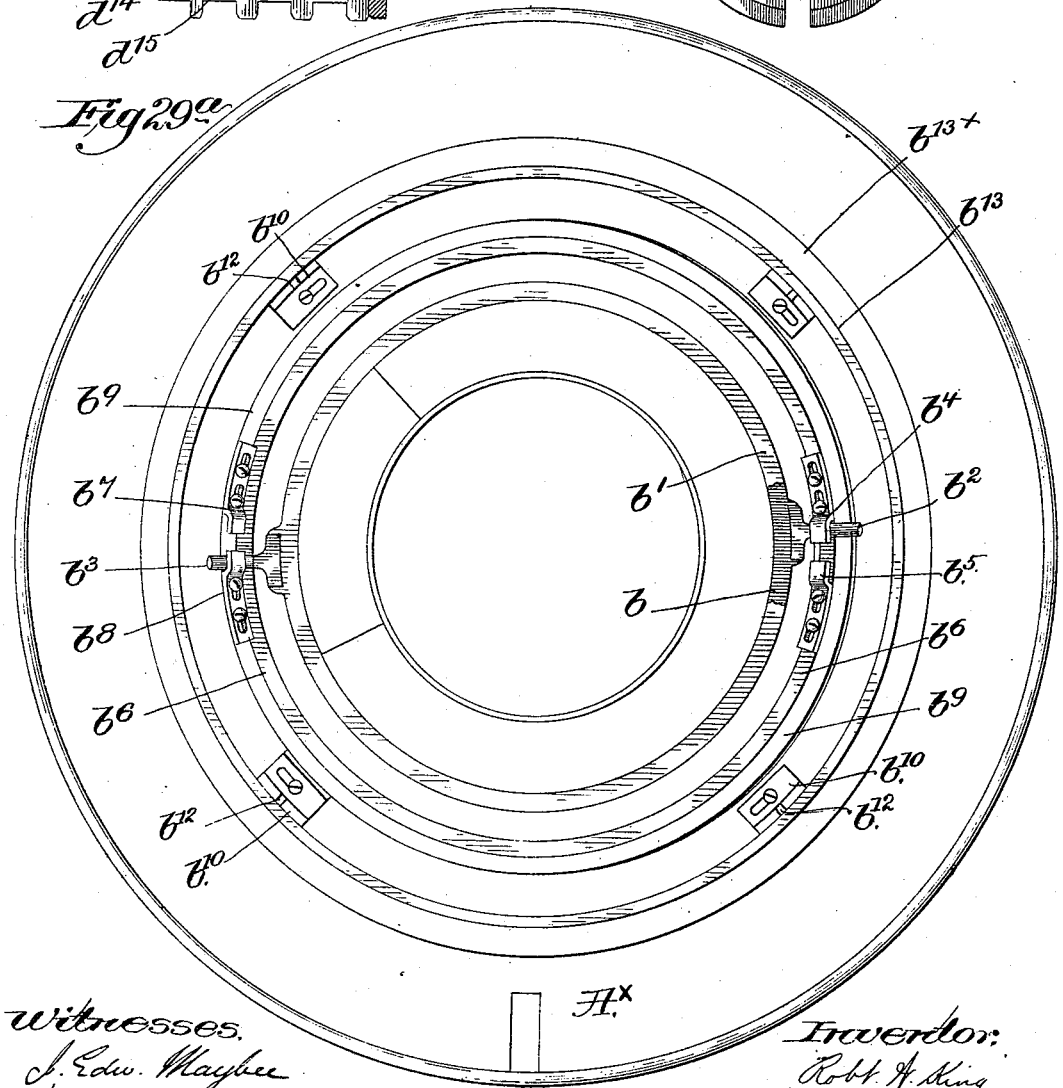

(No Model.)
22 Sheets—Sheet 19.
R. W. KING.
KNITTING MACHINE.
No. 479,986.
Patented Aug. 2, 1892.
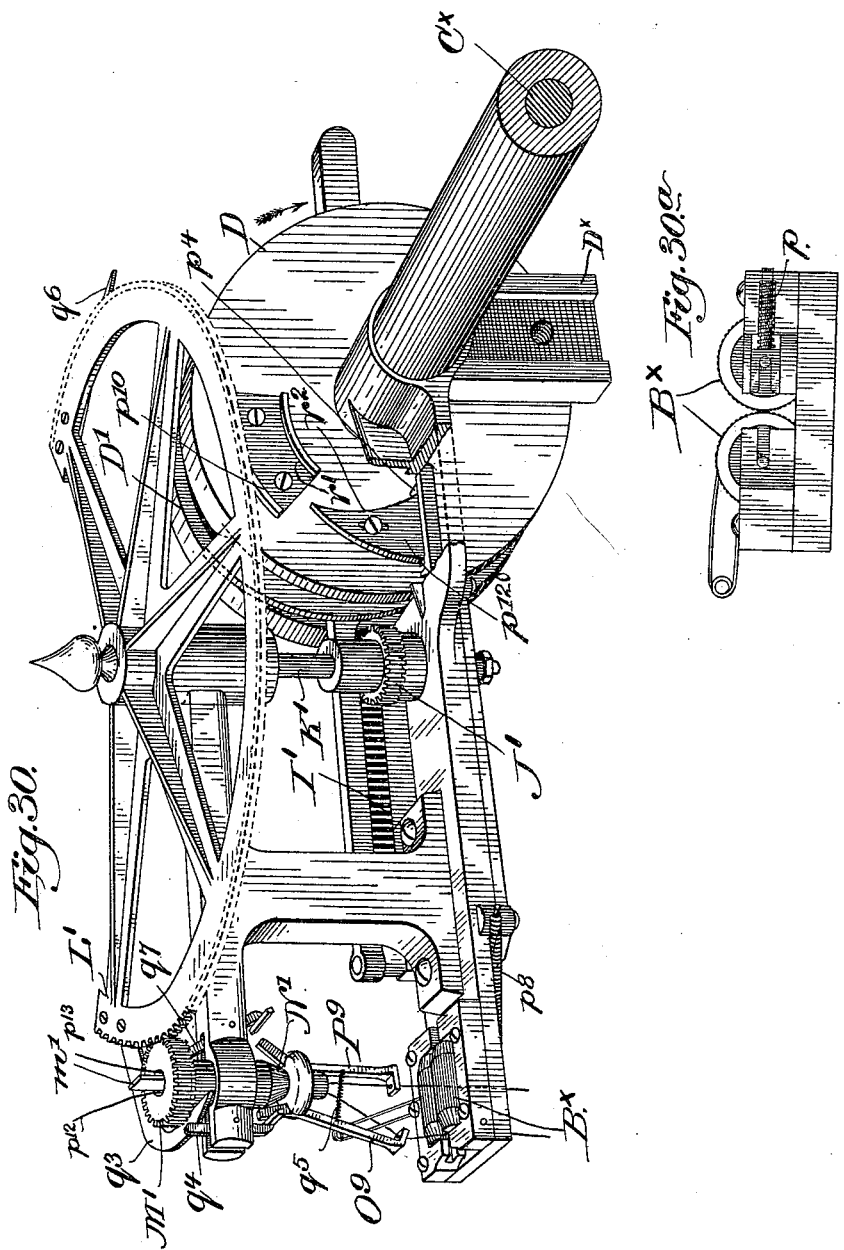

(No Model.)  
22 Sheets—Sheet 20.
R. W. KING.
KNITTING MACHINE.
No. 479,986.  
Patented Aug. 2, 1892.
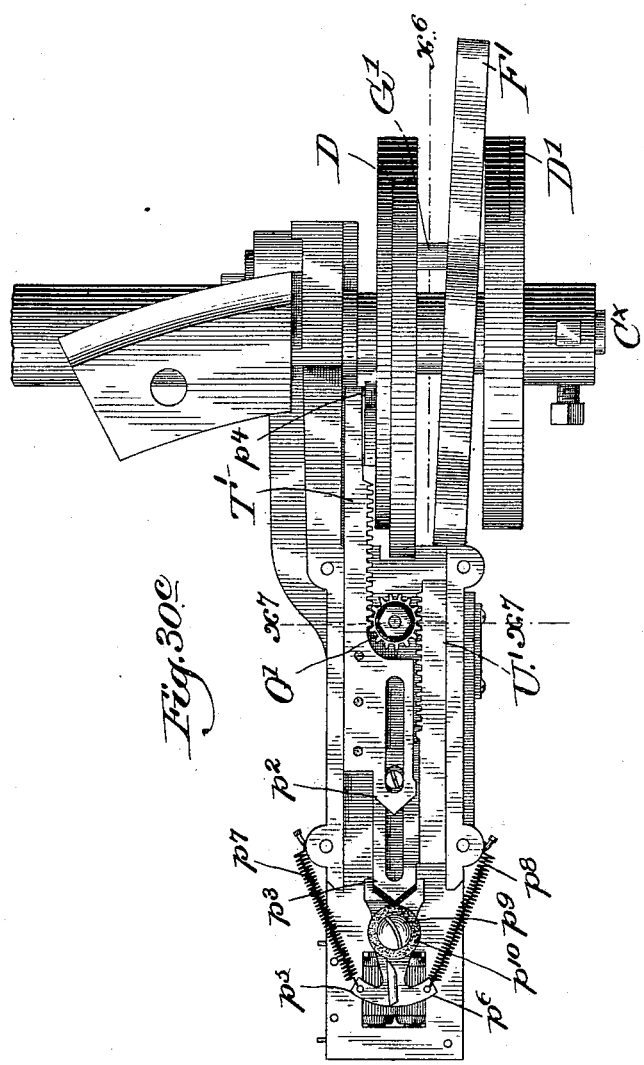
Witnesses.  
J. Edw. Maybee  
W. G. McMillan
Inventor:  
Robt. W. King  
by Donald C. Ridout & Co.  
Attys.

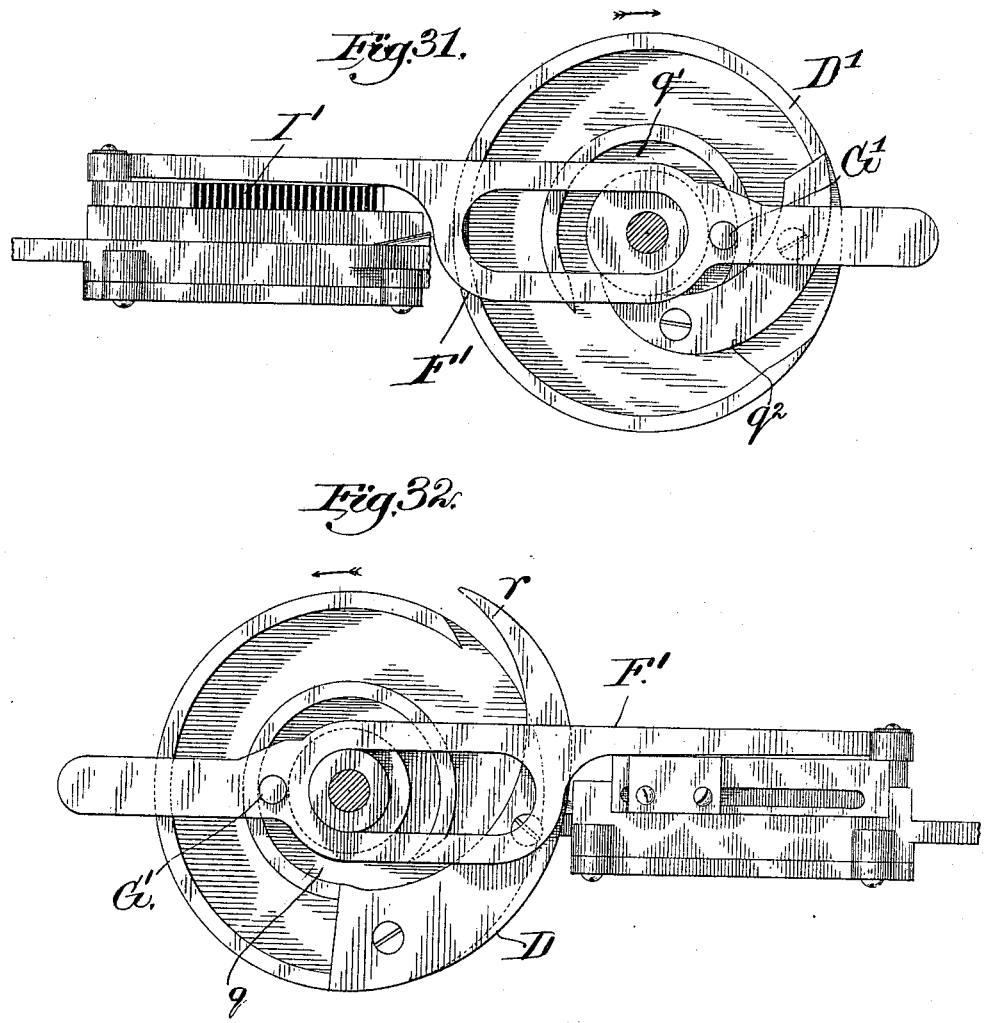

(No Model.)

R. W. KING.
KNITTING MACHINE.

No. 479,986.

22 Sheets—Sheet 22.

Patented Aug. 2, 1892.

Witnesses.
J. Edw. Maybee
N. G. McMillan

Inventor:
Rob't. W. King
by Donald C. Ridout & Co.
Attys.

THE NORRIS PETERS CO., PHOTO-LITHO., WASHINGTON, D. C.

United States Patent Office.

ROBERT W. KING, OF MONTREAL, CANADA.

KNITTING-MACHINE.

SPECIFICATION forming part of Letters Patent No. 479,986, dated August 2, 1892.

Application filed October 20, 1891. Serial No. 409,308. (No model.)

*To all whom it may concern:*

Be it known that I, ROBERT WILLIAM KING, of the city of Montreal, in the county of Hochelaga, in the Province of Quebec, Canada, have invented a certain new and useful Improvement in Knitting-Machines, of which the following is a specification.

This invention has for its object to improve and simplify the construction of that class of knitting-machine wherein the cam-ring has at times a rotary motion, as when knitting the leg and foot of a stocking, and at other times a reciprocating motion, as when knitting the heel and toe of a stocking.

This present invention is designed as an improvement upon the machine represented in United States Patent No. 453,059, dated May 26, 1891, the same containing peculiar guiding-gates occupying a peculiar and novel position with relation to knitting and non-knitting cam-grooves.

The machine herein to be described has a series of sinkers mounted upon a cone-shaped bed, as such a bed enables the machine to be readily changed to adapt it to knitting hosiery of many different sizes.

In the machine herein to be described provision has been made for employing needle-beds shaped to resemble conical frusta of various diameters at their smaller ends, and for sake of brevity I shall herein designate said beds as "conical beds." The beds referred to are interchangeable and receive each its own proper number of needles, the same cam-ring having the knitting and other cams co-operating with whatever conical bed may be used and with whatever number of needles may be therein contained, so that in a factory having a limited number of machines any desired number of them may be easily and quickly changed to produce any desired size of hosiery.

The machine herein to be described is provided with means whereby it is rendered automatic in its operation throughout the production of a stocking, and as the invention is here embodied the machine produces a tubular web having bulges therefrom at proper distances to constitute heels and toes, the web so produced being severed at desired intervals, and, if desired, suitable slack courses may be made to aid in putting on rib-tops in a topping-machine. The stocking-web when divided may be thereafter treated and finished in any usual way. The guiding-gates herein employed have combined with them means whereby they may be operated automatically, and between the points of the guiding-gates I have combined with the cam-ring a pivoted needle-deflector easily turned by its contact with the butt of a needle in the rotation of the cam-ring without damage to the said butts, it occupying a position between the free ends of the guiding-gates, thus closing the non-knitting groove when the gates are in their elevated position, the said deflector by being pivoted having many advantages over a sliding cam—as, for instance, in reduction of power and liability of breaking the needles. The needle-bed has erected upon it between its ends a guide for a jack or sinker actuating ring, and mounted upon a suitable fulcrum upon the outer side of the conical bed is a series of jacks or sinkers, the outer ends of which are operated by the said jack or sinker actuating ring, the said guide being slotted for the passage through it of the butts of the needles when drawn up, a portion of the guide forming a seat for the outer ends of the sinkers as the stitch is being drawn. The needle-cam ring, which is also conical, has mounted upon it a peculiar latch-guard and thread-rest to be described. Co-operating with the needle-bed and cam-ring are stop rings or racks deriving their motion in opposite directions from what is herein denominated "racking mechanism," the said stop-rings having stops to control the distance apart of tripping-pins, which at the proper times in the reciprocation of the cam-ring during narrowing and widening, as in the production of heels and toes, determine when the guiding-gates shall be moved, so as to put out of the knitting-grooves such needles as may not be required for the course next to be made in narrowing or put into the knitting-grooves such needles as may be required in the next course in widening. Means have been provided for varying the length of the stitches, it being desired to make a shorter stitch at or near the ankle and in the foot of the stocking to thereby fashion the same, the means consisting, essentially, of a vertically-movable raceway under the control of a monitor or pattern chain or surface, the said raceway supporting one end of a lever suitably connected at its other end to a carriage, upon which is mounted the main drawing-down cam. Means have been provided for effecting the change from circular to reciprocating knitting for the cam-cylinder, and vice versa, the said means including a continuously-rotating disk, a vibrator, and a stud mounted upon a slide made radially movable in a gear-wheel and adapted to engage a notch in either the disk or the vibrator, the said stud when in the disk effecting the rotary motion of the said toothed gear and when in the notch in the vibrator effecting a reciprocating motion of the same gear. Herein the difference in the open space in the conical needle-bed determines the diameter of the tube to be knitted, or, in other words, the more or less the apex of the cone is removed the greater or less the effective diameter of the conical bed. It will be understood that the base of the cone, or the part which is grooved for the reception of the needles, is always of the same pitch, no matter what the diameter of the web being knitted, and hence the same cam-ring and its cams may operate whatever needles are put into the needle-bed; but it will be understood that as the conical bed is longer or shorter from top to bottom, as it will be with smaller and larger work, the length of the needles used must be adapted to the length of the conical bed. It will be understood that as the conical bed varies in length the path traversed by the hooks of the needles in taking thread from the thread-guide will vary very materially—as, for instance, the path through which the hooks travel when the bed is long and the work is small will be that of a quite acute angle, whereas when the conical bed is short and the work is of greater diameter the path through which the hooks travel will represent a greater angle; but notwithstanding this variation I have by experiment devised a set of cams which operate perfectly with these needles of varying length. The construction of the support for the sinkers and the shape of the sinkers are such that the action of the actuating-ring for moving the sinker tends to keep the latter seated upon their pivots when the hooks of the sinkers occupy their depressed positions, yet by removing a portion of the said ring opposite the outer end of any sinker such sinker may be readily withdrawn from the machine.

The employment of a conical bed in connection with the peculiar guiding-gates herein contained is of especial advantage in a machine capable of circular and reciprocating movements, because the butts of the needles near the base of the cone are sufficiently separated, notwithstanding the close arrangement of the hooked ends of the needles, to afford greater time and therefore certainty of operation of the gates in their action upon any predetermined needle.

The machine has been provided with novel and peculiar thread-feeding mechanism by or through which an entirely-independent thread may be supplied automatically for the production of the heel or for the production of the toe, thus making the same of a different yarn or of a different color, and, if desired, instead of introducing a distinct different yarn and removing the yarn used in the leg and foot I may add to the thread employed in the leg and foot an extra or reinforcing thread during the production of heels and toes. I have provided shears or cutting mechanism for severing the knitting-threads at the proper times.

The machine herein to be described, instead of knitting a web such as referred to continuously, may be made to knit a stocking as a continuation of a rib-top, the said rib-top having had its loops transferred upon the hooks of the needles brought into one plane called a "topping plane," and in the machine to be described (it showing a conical bed having knitting and non-knitting grooves) the topping plane is synonymous or the same as the plane occupied by the butts of the needles when they are in their non-knitting position.

The conical bed herein to be described is peculiar in that it has a tubular shank extended from its inner shell-like exterior at or near its smaller end, thus enabling said shank at a point within the enlarged base end of the bed to be surrounded by a friction-ring which carries the knitting-cam ring.

The particular features in which this invention consists will be hereinafter more fully described, and pointed out in the claims at the end of the specification.

Figure 2:
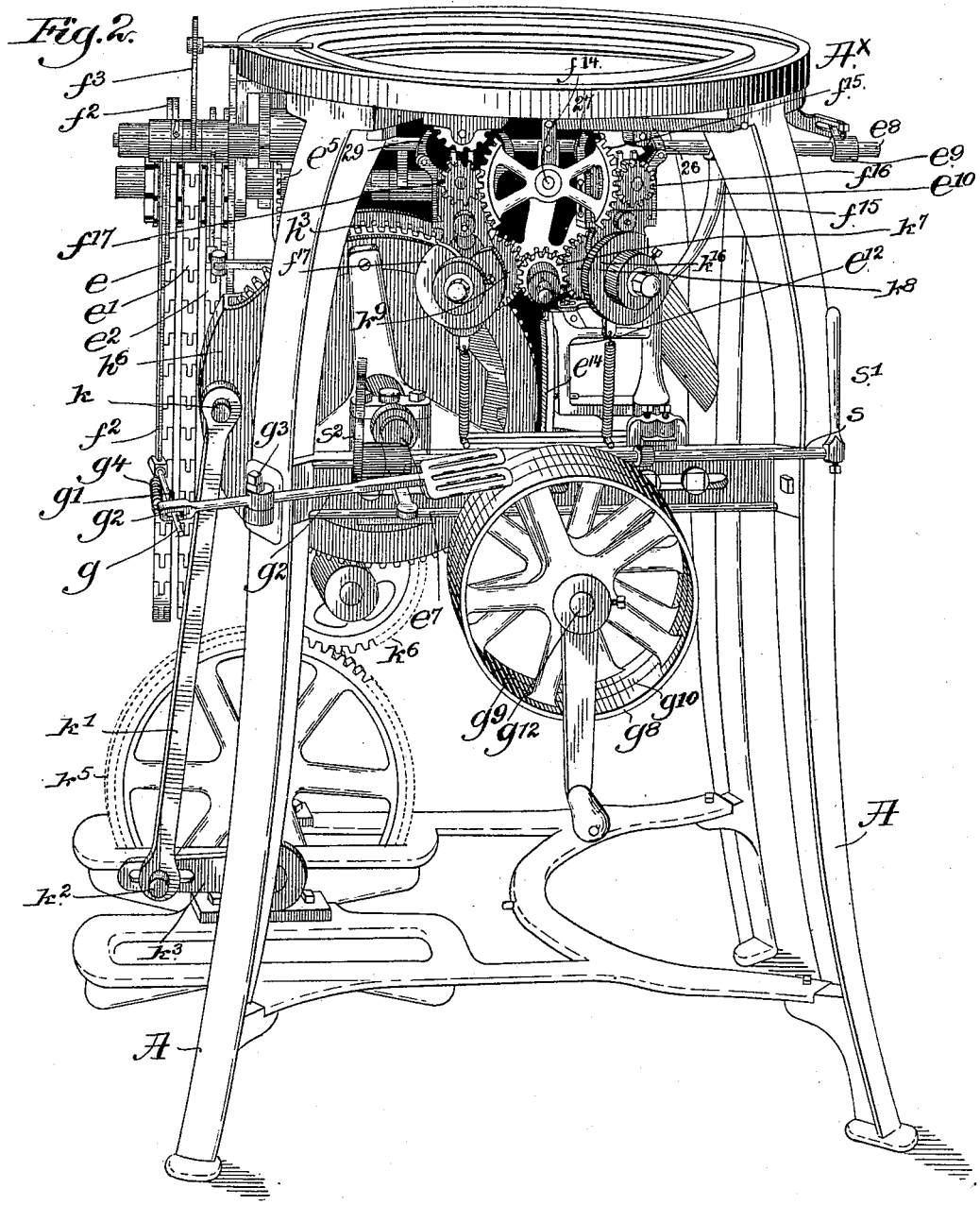
Figure 3:
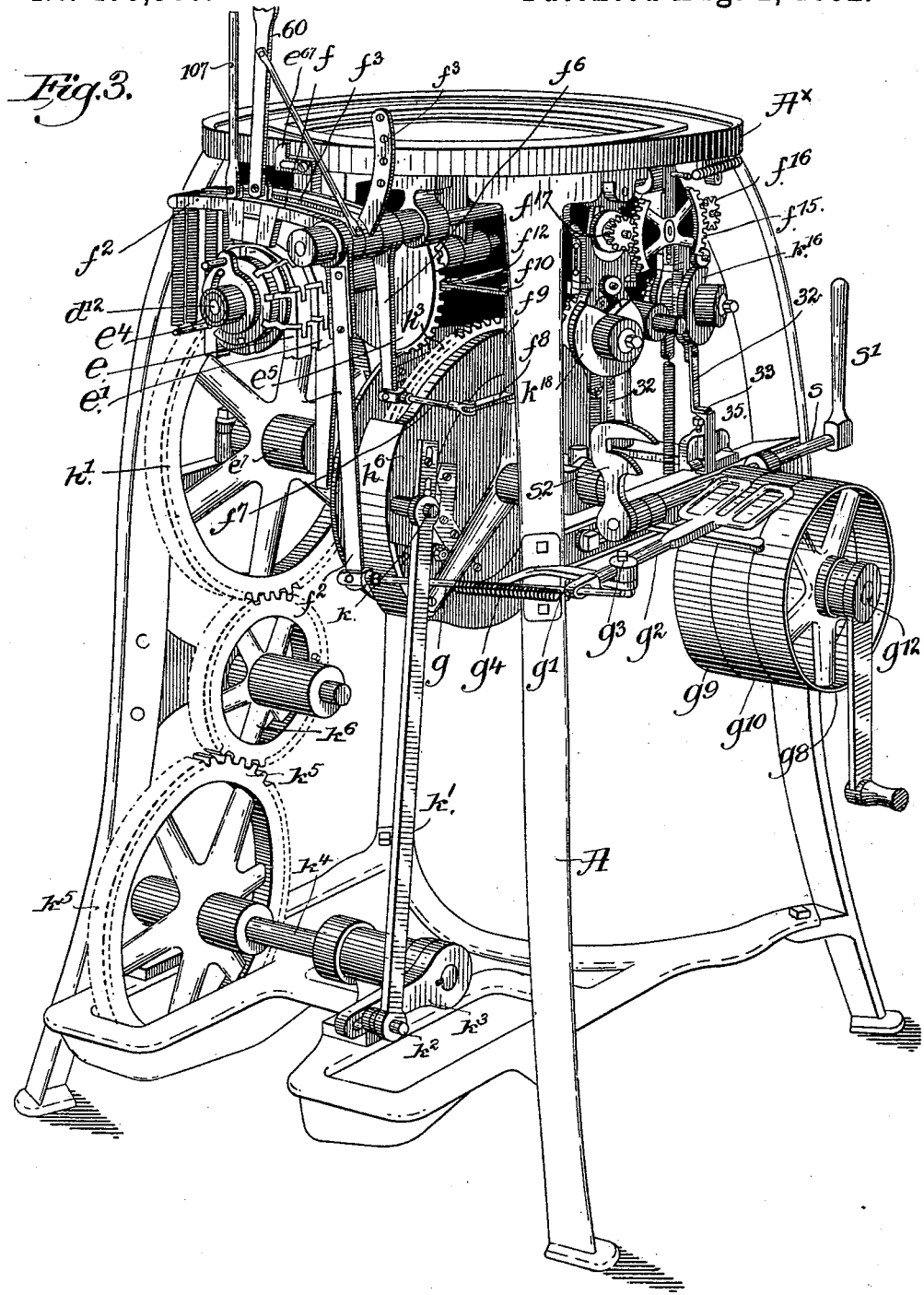
Figure 4:
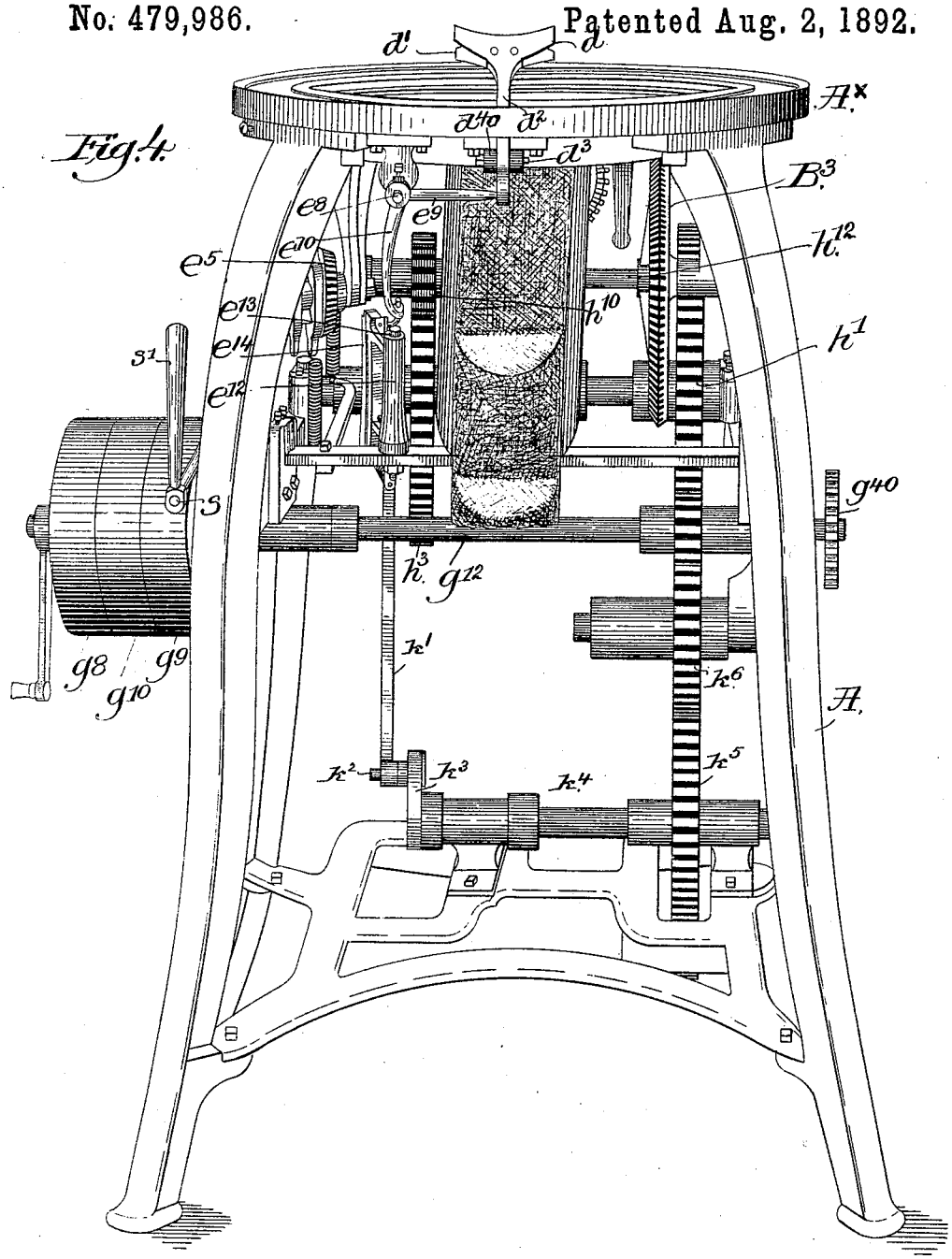
Figure 9:
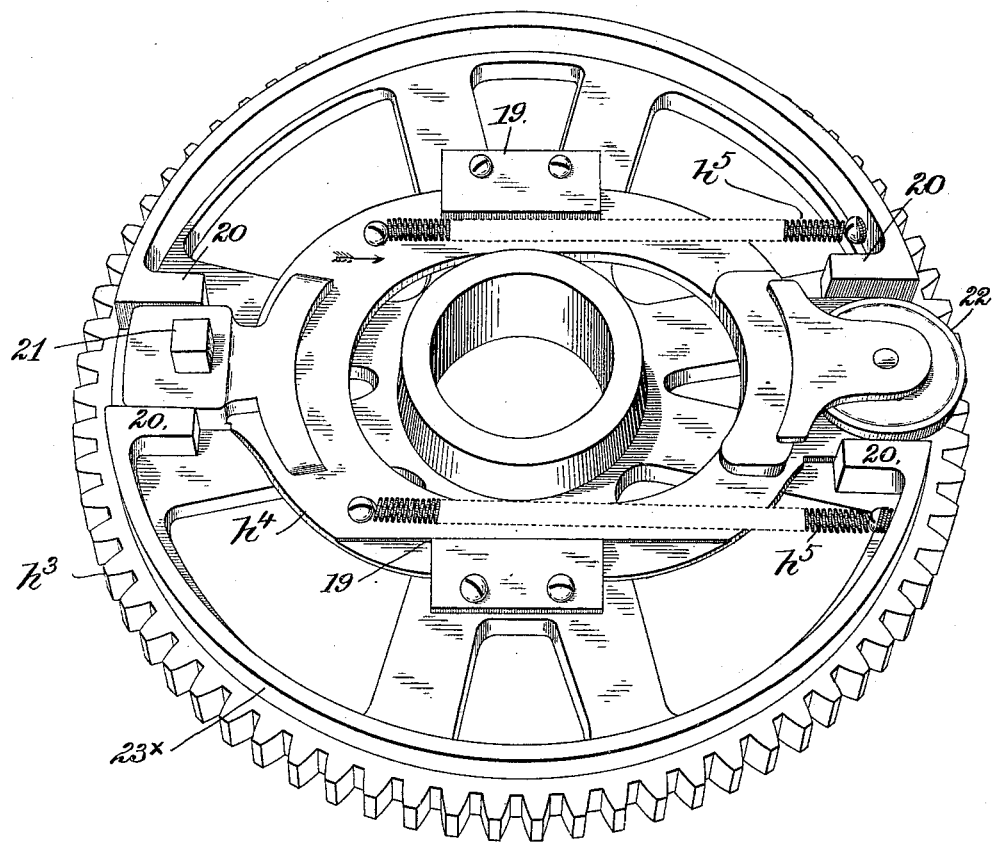
Figure 13:
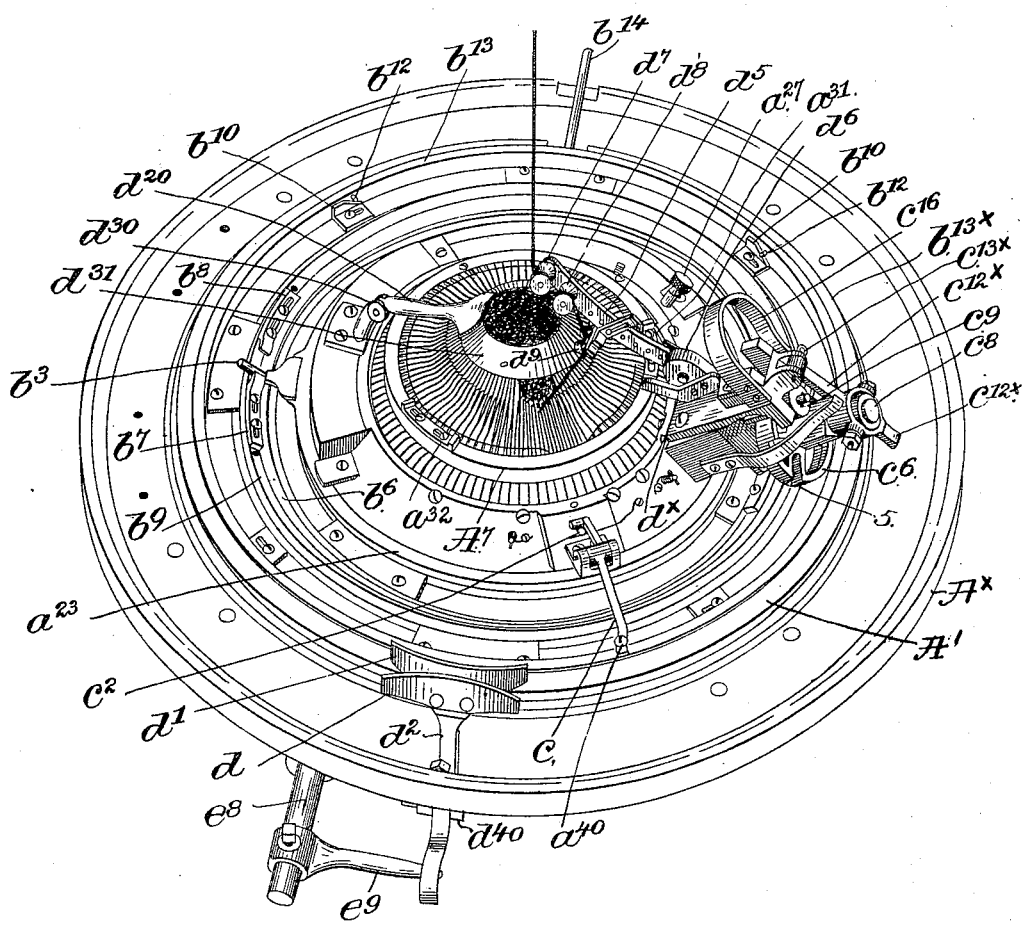
Figure 33:
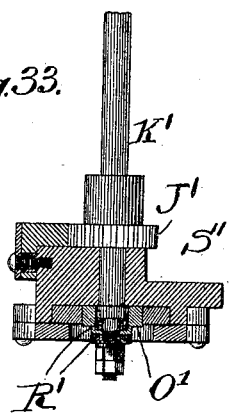
Figure 30B:
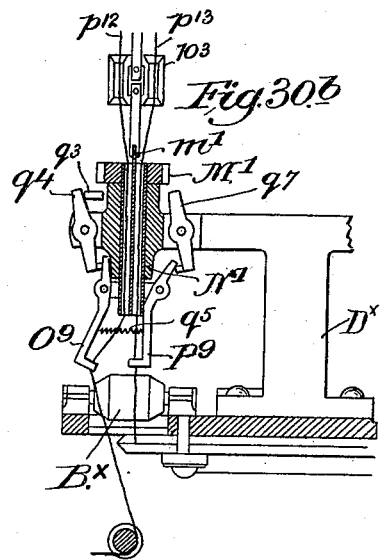
Figure 34:
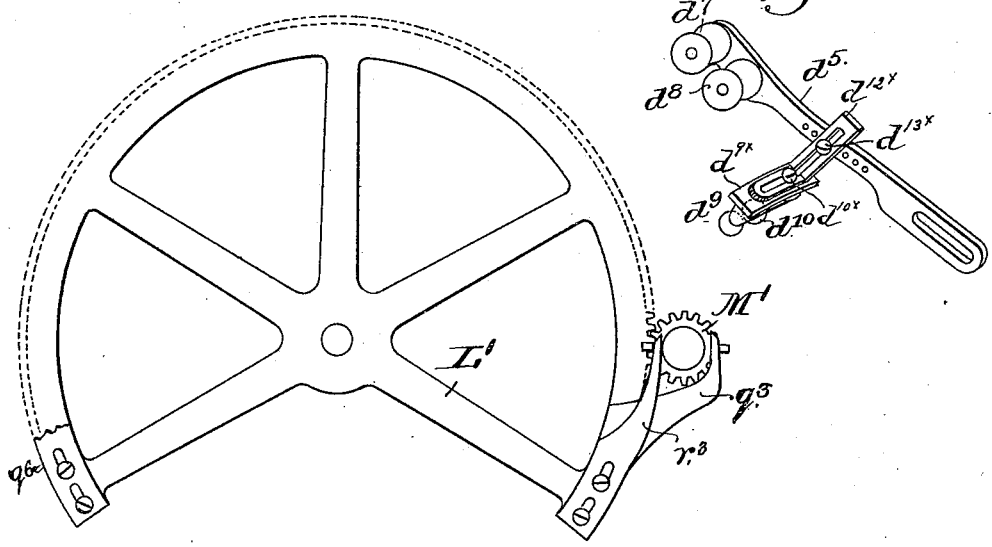
Figure 35:
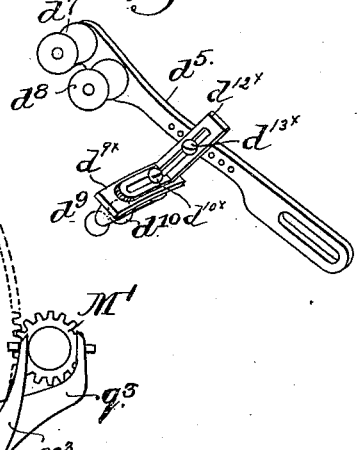

Figure 1 is a perspective view of a machine embodying my invention, the view being taken from the right, the pattern or monitor chains being omitted, the parts shown on said figure being shown on a larger scale on other figures. Fig. 2 is a perspective view, looking toward the left-hand side thereof, of the main portion of a knitting-machine, the conical needle-bed and bed-plate supporting it being also omitted, the parts so omitted to enable the view to be made on a larger scale being represented in other figures, the legs 32 and stilts 35 shown in Figs. 3 and 15 being omitted. Fig. 3 is a perspective view of the parts of the machine shown in Fig. 2, looking at it from the rear, together with some additional monitor-levers and their connections. Fig. 4 is a perspective view of the parts of the machine shown in Fig. 2, looking at it from the front, the said machine showing the work depending from or lying in the delivery-trough. Fig. 5 is a rear elevation of my improved machine particularly to show the driving mechanism, the said figure also showing the bobbins for supplying the thread, the shipper-lever being shown, however, in a different position; Fig. 5$^a$, a detail of the rod $g$ and some of its parts. Fig. 6 is a partial left-hand end elevation of the machine represented in Fig. 2, chiefly to show the change-gearing, the monitor-wheel, part of one of the chains, a monitor, and the controlling-lever, devices to actuate it, and the brake to be described. Fig. 7 is an enlarged detail in perspective of the main shaft and the disk of the change-motion fast thereon. Fig. 8 is an enlarged perspective of the vibrator forming part of the change-motion. Fig. 9 is an enlarged perspective of the change-motion gear-wheel containing the carriage provided with the coupling-stud to be described. Fig. 10 is a view, on a smaller scale, showing the parts represented in Figs. 7, 8, and 9 as assembled, but detached from the machine. Fig. 11 is an enlarged sectional detail taken through one side of the needle-bed, the cam-ring, and the parts instrumental in moving the guiding-gates. Fig. $11^a$ is a perspective detail of the lever $c^3$. Fig. 12 is a partial section in the line $x$, Fig. 11, chiefly to show the cam which controls the movement of the guiding-gates. Fig. 13 is a perspective top or plan view of the bed-plate, the cam-ring, the cam-cylinder, needles, sinkers, &c., to be described. Fig. 14 is a detail, on an enlarged scale, of the devices constituting part of the racking motion to move the stop rings or racks in one or the other direction, the pinions $f^{16}$ and $f^{17}$ on the shafts carrying the eccentrics (said pinions belonging outside of the pawl-carrying frame) being removed, said pinions and double segment being, however, represented by dotted lines. Fig. 15 is a sectional detail, on an enlarged scale, through part of the bed of the machine, the section being substantially on the line $x'$, Fig. 14, the said figure showing the stop-rings and the rings carrying the tripping-pins, but one of the pins being shown, the leg 32 being, however, in position to rest on the stilt. Fig. 16 represents in section the top plate of the machine, the conical bed, and the cam-cylinder, the needles and jacks being omitted. Fig. 17 shows a section of the conical bed by itself. Fig. 18 is a like view with the needles, jacks, or sinkers, and jack or sinker actuating ring added. Fig. 19 shows in different positions the upper end of the controller, together with the end of the yoke, the controller being in its different positions, according to the work to be done. Fig. 20 is a section below the dotted line $x^{10}$, Fig. 11. Fig. 21 is an inverted plan view of the cam-ring laid out or developed, the guiding-gates and needle-director being shown in their knitting position for all-around or circular knitting. Fig. $21^a$ is a detail representing the guiding-gates and the needle-director in a different position, the guiding-gates being in their non-knitting position, the director being in the position that it will occupy during its first stroke for reciprocating knitting. Fig. $21^b$ is a section in the line $x^3$, Fig. 21. Fig. 22 is a top or plan view of the jack or sinker actuating ring, together with the driver deriving its motion from the cam-ring to move the sinker-actuating ring at the desired time. Fig. $22^a$ is a detail showing the shape of the cam portion of the jack or sinker actuating ring. Fig. 23 is a perspective detail showing the pattern-chain and the monitor-lever and parts employed for operating the raceway for varying the length of stitches, the said figure also showing the lever riding on the pattern-chain and connected with the carriage or slide supposed to be carrying the main drawing-down cam, a needle being shown in position. Fig. 24 is a detail explanatory of the means for the production of the slack course. Fig. 25 is a detail showing two of the monitor-levers and their toes, one of the levers being partially broken out to show parts behind. Fig. 26 is a detail showing part of the take-up mechanism. Fig. $26^a$ shows one of the thread-guiding swiveling sleeves; Fig. $26^b$, an end view of the yarn-guide $t^4$; Fig. 27, a detail showing the latch-guard, my improved thread-rest, and the yarn-guide; Fig. 28, a detail showing the pattern-chain $e^2$; Fig. $28^a$, a like view of the pattern-chain $e$. Fig. 29 is a diagram to be referred to. Fig. $29^a$ is a detail top or plan view of the bed-plate with its stop-rings and tripping-pins and their carrying-rings in place; Fig. $29^x$, a left-hand end view of Fig. $29^b$; Fig. $29^b$, an enlarged longitudinal section taken through the monitor hub or barrel, the figure showing one of the chains and its side or lateral projection. Fig. 30 is an enlarged perspective view of the thread-changing mechanism. Fig. $30^a$ is a detail showing in end view the clamping-rolls employed to hold the main threads employed in knitting; Fig. $30^b$, a sectional detail of the hollow thread-conducting shaft and some of its attached parts. Fig. $30^c$ is an under side view of the parts represented in Fig. 30, chiefly to illustrate the shears or cutting mechanism and their actuating parts, the cover being removed. Fig. 31 is a partial section in the line $x^6$, Fig. $30^c$, looking to the right. Fig. 32 is a like sectional detail, looking to the left. Fig. 33 is a sectional detail in the line $x^7$, Fig. $30^c$. Fig. 34 is a detail showing part of the gear-segment with the reinforcing cam-finger attached. Fig. 35 is a detail showing the yarn-guide and some of its attached parts.

The framework consists of suitable legs A, on which is mounted the table-plate $A^x$. The table-plate is cut away centrally, as shown in Figs. 2, 3, 4, 11, and 13, for the reception of the bed-plate A', which receives the cylindrical shank $A^2$ of the needle-bed $A^3$, which in shape resembles a hollow frustum, but which I shall denominate hereinafter as a "conical bed." The shank is held in place by suitable screws $A^{xx}$. I have achieved excellent results by making the inclination of the exterior of the bed at an angle of about forty-five degrees from a perpendicular.

The effective size of the needle-bed in the production of a stocking, and the diameter of the tube to be knitted for the same depends upon the diameter of the smaller end of the bed.

Referring to the diagram Fig. 29, which shows in elevation an entire cone, it will be seen that by cutting the same in the line $z\ z$, $z'\ z'$, or $z^2\ z^2$ beds will be formed of different lengths and having openings at their smaller ends of different diameters, the beds being alike, except as to length and diameter of the openings at their smaller ends. A bed of such form of whatever effective diameter at its smaller end may have its shank entered in one and the same central opening in the bed-plate $A'$, and a tube of greater or less diameter may be knitted on the machine by substituting a bed having the proper-sized opening at its smaller end. The needle-bed is grooved from end to end for the reception of the shanks of the needles, and near its smaller end the bed is notched or grooved, as at $A^4$, between the needle-grooves for the reception of jacks or sinkers $A^5$. The needle-bed has erected upon it between its ends a guide-rim $A^6$ for the actuating-ring $A^7$, which operates the jacks or sinkers, the said guide-rim being slotted in line with the needle-grooves to permit the butts of the needles to be withdrawn from the bed at its small end, and being provided at its inner side or edge with a seat portion for the outer ends of the sinkers when the stitch is being made, and below the guide-rim and the upper end of the bed and outside the same is an annular notch $A^8$ for the reception of a wire $A^9$, which I shall denominate the "fulcrum-wire" for the jacks or sinkers. The shank $A^2$ of the bed, located between its ends, as illustrated, besides adding very materially to the strength of the bed and enabling a comparatively-light-weight bed to be used, also serves as a guide for a friction-ring B, the hub of which has a running fit on the said shank.

The friction plate or ring B at its periphery has fitted to it and carries the cam-ring $B'$, the shank $A^2$ of the bed constituting a center bearing for the said cam-ring in its movements, thus keeping its center of rotation coincident with the center of the bed, the employment of the shank $A^2$ as the center of movement for the cam-ring enabling the contacting-surfaces to be of smaller diameter than the large end of the bed, which is of advantage, as the nearer the hub of the cam-ring to its center of rotation or movement the slower the surface-speed of the hub on its bearing, (the shank,) other things being equal, and the less the friction, and consequently the less the power required to move the cam-ring in knitting. The lower end of the cam-ring has beveled teeth $B^2$, which may be engaged by a bevel-gear $B^3$, fast on a shaft $h^{12}$, (see Figs. 1, 5, and 12,) adapted to be either rotated or reciprocated, according to whether the cam-ring is to be rotated for circular work or reciprocated for reciprocating knitting, as when narrowing and widening is being done in the production of heels and toes.

The needle-grooves in the conical bed are farther apart at the larger than at the smaller end of the bed, and consequently the substance of the bed between the butts of the needles in the cam-line is left so thick as to prevent any accident to the bed due to pressure of the cams on the butts of the needles.

The conical beds may have grooves more or less in number and of any desired gage for the reception of the needles to be used, and the longer the bed the longer the needles; but in the machine to be described herein the same cam-ring, without alteration of its cams, to be described, may be made to operate with any bed, whatever may be its length or the number of needles used or the gage of the needles, and this being so an operator may quickly remove from the bed-plate a bed adapted for the formation of a stocking of one size or diameter of leg and substitute for it quickly a bed suitable for the production of a stocking of a different diameter or size of leg, this change occupying but a few moments. These extra conical beds for the needles to be actuated by the cam-rings cost but little as compared with the cost of the other main parts of the machine, and with a number of such beds stockings of any size or gage may be made on the same machine. This facility for quickly changing from one to another sized sock or stocking by changing the length of conical bed overcomes the chief and greatest obstacle heretofore existing to the introduction of entirely-automatic machines, for heretofore automatic machines, as a general rule, were capable of making a stocking or sock of but one size, and any attempt to change the machine to make a stocking of another size amounted in most cases to about as much as would be required to produce an entire new machine.

The increased distance between the butts of the needles in the cam-line, as described, is of especial value in connection with a cam-ring having guiding-gates and a needle-deflector such as will be described, as the said parts are afforded a longer time in which to select or divert the needles into the knitting or non-knitting path.

Each conical bed will have needles of the proper length and gage, and the needles may be kept in the grooves of the beds when the latter are not in use in the machine, a string being preferably tied about the beds and needles in the grooves therein, the said string entering an annular groove $A^{10}$ in the bed below the guide $A^6$.

The sinkers $A^5$ have points $B^6$ to engage and hold down the work while the needles are ascending, as at the right in Fig. 18. Their outer ends are shaped to be engaged and actuated by a suitable cam-surface (see Fig. 22$^a$) at the inner side of the jack or sinker actuating ring $A^7$, the outer ends of the said jacks or sinkers, as herein represented, being notched to embrace a cam portion of a plate forming part of said ring, each sinker also having an open slot at one edge, preferably at its lower edge, between its ends to embrace and rock upon the fulcrum-wire $A^9$, the ring $A^7$ acting normally to keep the said sinkers seated on the said fulcrum-wire, as represented at the right in said Fig. 18, as when the points of the sinkers are holding down the work, the latter figure at its opposite sides showing needles and jacks or sinkers in different positions. The projection $A^6$ at its inner side between the grooves in which the needles reciprocate has a stationary seat, preferably concaved, and against the seat (see left of Fig. 18) bear the tails or outer ends of the sinkers when the sinkers are in position for the needles to draw the yarn over their breasts. The breast of each sinker is curved or swept from the point of contact of the tail of the sinkers with the seat when the sinker is in the position described, the strain of the work on the sinker while drawing the stitch being sustained by the seat rather than by the sinker-actuating cam. Sustaining the tails of the sinkers on a stationary seat rather than on a moving cam obviates all wear on the sinkers in a direction to alter their effective strength. It will also be noticed that inasmuch as the tails of the sinkers rest on a stationary seat, as described, the breasts of the sinkers will always remain in the proper knitting-line, and uniform knitting will be the result, whereas if the breast of the sinker were swept from the fulcrum-wire of the pivot, as heretofore done, any variations in the diameter of the fulcrum-wire or wear thereof or of the sinker would result in the retirement or falling back of the breasts of the sinkers from the knitting-line, which would cause irregular knitting, which is appreciable and detrimental, especially in fine gages. The cam-ring at its inner side, (see Fig. 21,) which shows the said ring developed, has a suitable ledge or flange $a$ forming part of it, the upper edge of the flange always supporting the butts of all of the needles, which in any part of the operation of the machine are not in the knitting-groove. The cam-ring has an attached guard-strip $a^2$, and below it are segmental bars $a^3 a^4$, provided at their outer ends with latches $a^5 a^6$, while at the inner ends of the said bars are pivoted the guiding-gates $a^7 a^8$, substantially such as in the patent referred to, there being a non-knitting groove $a^9$ between the guard $a^2$ and the bars $a^3 a^4$. The guiding-gates have their points slightly separated, and in practice they will be moved in unison from one to their other positions by devices to be described. Between the ends of the guiding-gates is a needle-director $a^{18}$ of heart or triangular shape, it having a pin $a^{20}$, which is extended through a hole in the guard $a^2$ and is surrounded beyond the guard by a spiral spring $a^{20\times}$ (see Fig. $21^b$) or other suitable friction device to act as a drag and prevent the director from turning too freely. The pivoted director, shaped and graded substantially as represented and located between the guiding-gates, is easily turned by the contact against it of the butts of the needles, and the grade of the director is such as to offer the minimum of frictional resistance to the needle, thus reducing the strain on the needles and making the machine more reliable in operation than were the director made as a sliding cam. The director near its point at its lower side will preferably have a toe or projection $a^{60}$, as best shown in Fig. $21^b$, to contact with the guard $a^2$ to limit the extent of movement of the director.

The cam-ring has attached to it plates $a^{10}$ $a^{12}$ and needle-elevating plates $a^{13} a^{14}$ and a center plate $a^{15}$, provided with a projection having a concaved face opposite the director, the curve of the said projection being described substantially from the center of oscillation of the director, the said plate being adjustable on or with relation to the cam-ring by a screw $a^{22}$, the adjustment of the plate compensating for wear and adapting the machine to the thickness of the butt of the needle being used, so as to afford the proper amount of space between the plate and the point of the director.

The cam-ring is grooved for the reception of a slide $a^{23}$, to which is attached the main drawing-down cam $a^{24}$, which acts to draw down the needles when circular knitting is being done and also when the cam-ring, during reciprocating knitting for the heel and toe work, is being reciprocated in the direction of circular knitting.

The cam-ring at a distance from the main drawing-down cam and at the other side of the director is provided with a second plate or slide $a^{25}$, to which is attached an auxiliary drawing-down cam $a^{26}$, which cam acts to draw down the needles only during that stroke of the cam-ring in reciprocating knitting which is opposite the direction of movement of the cam-ring in circular knitting. The plate $a^{25}$ is adjustable upon the cam-ring and is held in its adjusted position by a screw $a^{27}$, (see Fig. 13;) but the slide-plate $a^{23}$ will in practice be moved automatically during the knitting of a stocking, so as to lengthen and shorten the stitches to effect the contraction or fashioning of the knitted fabric at and about the ankle of the stocking and in the foot and to make long stitches in the upper part of the leg and when narrowing and widening, for during this latter operation when an extra-sized thread or a reinforcing-thread is added the longer stitch must be made. It is obvious, however, that by or through a pattern-chain, as will be described, the loops may be longer or shorter at any point during the knitting.

The knitting-groove for the needles is marked $a^{30}$, and the shape of it can be readily followed in the drawing, Fig. 21.

As stated, I have by experiment succeeded in making the cams for moving the needles of whatever length and in a bed of whatever length and diameter at its upper end, so that the said needles may all be successfully actuated by one and the same set of cams.

The jack or sinker actuating ring has adjustable stops $a^{31}$ $a^{32}$ and a removable section $a^{33}$, which enables any jack or sinker when brought in line with it to be removed from the fulcrum-wire.

The cam-ring is shouldered to receive two rings $b$ $b'$, one on top of the other, the ring $b$ having a tripping-pin $b^2$, (shown in Fig. 29$^a$,) while the ring $b'$ has a tripping-pin $b^3$. (Also shown in said figure and in Figs. 11, 13, and 15.) These tripping-pins enter, respectively, spaces between adjustable stops $b^4$ $b^5$ on the stop-ring $b^6$ and stops $b^7$ $b^8$ on the stop-ring $b^9$, the said stops being made adjustable on the said stop-rings to afford more or less play or lost motion of the tripping-pins between the said stops of the stop-rings to provide for adjustments according to different gages of needle-beds and to enable any individual needle to be brought down. Each stop-ring at its under side has a series of teeth to be engaged when it is desired to shift the stop-rings and the tripping-pins, as will be described.

The bed-plate has adjustably attached to it cam-blocks $b^{10}$, (see Figs. 11, 13, and 23,) on which bear pins $b^{12}$ of an annular raceway $b^{13}$, suitably guided within a curb $b^{13\times}$, and having a projection $b^{14}$, by which the said raceway may be turned more or less, and as it is turned be raised or lowered as desired, the raising of the ring effecting the lengthening of the stitches and the lowering of the ring the shortening of the stitches, as will be described. On the top of this raceway, which entirely surrounds the cam-ring and is smooth and level at its top, runs or travels the outer end of a tension-lever $c$, Fig. 23, pivoted on a stand $c'$, fast on the cam-ring, the inner end of the said lever engaging a stud $c^2$, erected upon the slide $a^{23}$, to which is attached the main drawing-down cam $a^{24}$. Preferably the tension-lever, however, will have additional means—as, for instance, an adjustable screw $a^{40}$—by which to more carefully regulate the tension within the limits of the automatic adjustment. It will be understood, however, that this invention is not limited to the exact means shown between the raceway and the drawing-down cam to automatically adjust the same, or to the exact means shown for moving the raceway vertically.

In practice the tension-lever rides upon the raceway both when the machine is doing circular and reciprocating knitting.

The guiding-gates have lugs at their rear ends near their points, which lugs are embraced loosely by the inner end of a gate-moving lever $c^3$, having its fulcrum at $c^4$ in a slotted stand $c^5$, erected on the cam-ring. The patent referred to had a lever by which to move the guiding-gates to direct the butts of the needles into the knitting or non-knitting grooves, and the said lever was worked by hand; but herein the said lever has combined with it mechanism which will be described for moving it automatically. The lever $c^3$ is adapted, as herein represented, to be actuated by a cam $c^6$, having a sleeve-like hub $c^7$, which is mounted loosely upon a stud or pivot $c^8$, the cam being adapted to be both oscillated and to be moved toward and from the tripping-pins. The cam, as shown, has a locking-finger 2 to engage a finger or projection 3 of the said lever $c^3$, so that the said cam in its oscillations may rock the said lever positively on its fulcrum to raise or lower the points of the guiding-gates, such positive motion being of importance when running at high speed. The locking-finger 2 and finger 3 may, however, be omitted and the said lever be kept in contact with the cam by a suitable spring, as $c^{80}$, or the spring may also be used with the fingers, as indicated in Fig. 11. To avoid friction during the movements of the lever, I may and prefer to apply to the lever a friction-wheel $c^9$, which is adapted to run against a guide-plate $c^{10}$, forming part of a cover-plate $c^{12}$, attached by screw $c^{13}$ to the stand $c^5$. The cam $c^6$ has, as represented, two inclined slots 4 5, located, as herein shown, at about one hundred and twenty degrees apart, the cam having a depressed portion 6, and at each side of the said depressed portion a high part 7 8. The hub of the cam has an annular groove 9, which is entered by suitable studs connected (see Fig. 13) with a yoke $c^{12\times}$, pivoted at $c^{13\times}$ on the plate $c^{12}$, the outer or free end of the yoke being sufficiently extended beyond the hub of the cam to pass between shoes $d$ $d'$ of a controlling-lever $d^2$, pivoted at $d^3$ on a stand $d^{40}$ as when circular knitting is being done, and as represented in the left-hand diagram of Fig. 19 and as in Fig. 11, or to strike against the shoe $d$ as when the cam $c^6$ is to be moved into range of the tripping-pins to do narrowing and widening, or to strike the shoe $d'$ as when the said cam is to be moved away from the tripping-pins or out of their range as when circular work is to be recommenced. In order that the cam $c^6$ may not be affected by momentum or get out of place accidentally, its hub has been provided with a locking-block $c^{15}$, having, as herein shown, (see Fig. 20,) three sides, one of which is always acted upon by a suitable spring $c^{16}$.

It will be understood that the stop rings or bars will be racked or moved during narrowing to cause the stops attached thereto to travel, the stops of one bar toward the stops of the other bar during narrowing and during widening to travel away from each other, and that such movement of the stop-bars will cause the tripping-pins to be carried toward each other during the successive courses of narrowing, and then to be moved away from each other during the successive courses of widening, and consequently the tripping-pins may be struck sooner or later by the cam $c^6$ in the reciprocations of the cam-ring in one and then in its opposite direction course after course, and the said pins entering the slots 4 and 5 in the cam $c^6$ oscillate the said cam, each pin acting twice in succession, the cam being tipped one way as it passes a tripping-pin in one direction and being returned to its normal position as the cam-ring is moved in the opposite direction.

The direction of the slots 4 and 5 in the cam-wheel are such as to cause the cam $c^6$ to be operated at a faster speed as the tripping-pin approaches the hub of the cam, and it is during this fastest speed of the cam that the guiding-gates are shifted, the shifting of the said gates being very quick, substantially instantaneous. The gradual increase and decrease of the speed of the cam also insures a smoother action of the parts at high speed.

The cam-ring has a driver $d^x$, (see Figs. 13 and 22,) which travels with the said ring, and in its movements when oscillating meets first one and then the other of the stops $a^{31}$ and $a^{32}$ of the jack or sinker actuating ring $A^7$ to cause it to travel thereafter with the cam-ring, the lost motion between the driver and the stops permitting the cam part of the sinker-actuating ring to get at the proper distance behind the knitting-cams of the cam-ring, as is necessary and usual in reversible knitting-machines having sinkers.

The cam-ring has mounted upon it an arm $d^{20}$, and preferably the said arm will be pivotally connected or mounted, as at $d^{30}$, and to the outer end of this arm is attached a combined latch-guard and yarn-support $d^{31}$, (see Fig. 27,) it being extended more or less about the raised ends of the needles and having, preferably, one or more suitable pins or projections, as $d^4$, to prevent the yarn in the reversing movements of the cam-ring from drawing up over and off the top of the said combined latch-guard and yarn-support. In accordance with my invention the yarn going to the needles is delivered by the eye of whatever yarn-guide $d^5$ used upon the outside of the combined latch-guard and yarn-support instead of being delivered from between the under side of the latch-guard and the needles, this delivery of the yarn from the outside of the latch-guard and yarn-support being one of the chief and essential features of my invention, it being applicable not only to machines of the class herein shown, wherein the needles are so actuated that they may have their hooks all put into the same plane to receive the loops of a rib-top, but also to any machine having a conical needle-bed, whether the cams are arranged to put the needles into topping position or otherwise.

In my first attempts to use a conical bed in a machine adapted to be reciprocated for reciprocating knitting I found that such a bed could not be used successfully unless I could in some manner devise some sort of latch-guard and yarn-support to keep the yarn from contact with the needles which were not being reciprocated to knit during the movements of the yarn-guide past the said needles.

In the employment of a series of needles arranged in a cylindrical bed, as in the patent referred to, the yarn may contact with the needles below their latches without detriment; but when the needles are arranged in a conical bed the result is different, for the yarn, if permitted to contact with the needles, will slide up toward the apex of the cone and become entangled with the latches and hooks. I have overcome this difficulty by interposing between the needles and the yarn-guide (see Figs. 13 and 27) a latch-guard and yarn-support which prevents the contacting of the yarn with the needles not being actuated for knitting, the yarn leaving the yarn-guide being deposited upon the latch-guard and passing therefrom to the needles used for knitting, the yarn during the further movement of the latch-guard past the needles not used for knitting being received upon the said latch-guard and sliding up on the same out of range of the latches or hooks of the needles, the yarn being prevented from slipping off the upper end of the latch-guard by means of suitable pins or projections, such as $d^4$. When the cams of the cam-ring are so arranged as to put the needles into position to receive the loops of a rib-top, then it is essential that the combined latch-guard and yarn-support extend entirely about the circle occupied by the hooks of the elevated needles; but if the cams in the cam-ring are arranged merely to enable circular and reciprocal knitting to be done without provision for bringing the hooks of the needles into one plane to receive a rib-top, as in the patent referred to, then the combined latch-guard and yarn-support need not be extended entirely about the circle of needles, but may be made of usual length.

Referring now to Fig. 27, showing the latch-guard as extended entirely about the circle of needles, it will be noticed that the yarn-guide $d^5$ is attached to a stand $d^6$, and that the upper end of the yarn-guide has two rollers $d^7$ $d^8$, between which the yarn passes, and two other rollers $d^9$ $d^{10}$ (see, also, Fig. 35) of peculiar shape, between which the yarn passes to contact with the outer side of the latch-guard, the two rollers $d^9$ $d^{10}$ being considered desirable because the yarn is delivered over one roller when the cam-ring is being reciprocated in one direction and over the other roller when it is being reciprocated in the other direction, the said rollers serving merely to avoid friction on the yarn thus reducing the friction to the minimum and enabling soft yarns to be used with safety, and at the same time the employment of these rolls, which are rotated constantly by the yarn passing over them, is of importance, because when the free end of a second yarn to reinforce a heel or toe or to be employed in the knitting of a heel or toe comes in contact with the said moving rolls the yarn is fed forward with certainty to the needles. The rollers $d^9$ $d^{10}$ will in practice be mounted on studs carried by a plate $d^{9x}$, connected adjustably by a screw $d^{10x}$ to the foot of a bracket $d^{12x}$, adjustably attached by a screw $d^{13x}$ to the arm $d^5$, the adjustment of the said parts enabling the rolls $d^9$ $d^{10}$ to be adapted to any-sized needle-bed which may be used. When the loops of a rib-top are to be applied to the needles put into topping position, the combined latch-guard and yarn-support will be turned back about its hinge to uncover the hooks of the needles. Under the bed and table-plate is a shaft $d^{12}$, (see Fig. 6,) having suitable bearings at $d^{13}$ $d^{14}$, the bearing $d^{14}$ being made as a sleeve (see Fig. 29$^b$) to receive upon it loosely a monitor or chain-carrying wheel $d^{15}$, it having suitable annular spaces for the reception in this present instance of my invention of three pattern-chains $e$ $e'$ $e^2$, to be described, placed side by side on the said monitor-wheel. The monitor-wheel at or near one end, as shown, is slotted or notched to be engaged by a locking device $e^3$, carried by a disk or wheel $e^4$, adjustably attached to the shaft $d^{12}$. This manner of mounting the monitor-wheel on its shaft enables the monitor-wheel to be disconnected from the driver, (the disk $e^4$,) so that the wheel may be turned backward or forward, as desired, independently of the rest of the machine, this being desirable—as, for instance, in case of accident to the knitting of a leg the loops may be run off and the monitor and its chains be reversed quickly into starting position ready to let the machine be started again to commence a stocking. The shaft $d^{12}$ has fast upon it a worm toothed gear $e^5$, which is engaged and rotated intermittingly by a worm-plate $e^6$, fast upon the main rotating shaft $e^7$. (See Fig. 5.) Under the table-plate is a rock-shaft $e^8$, (see Fig. 11,) having fast to it at its front end an arm $e^9$, which enters a slot in and actuates the controller-lever $d^2$, said shaft having a second arm $e^{10}$, (see Figs. 6 and 11,) which in Fig. 6 is shown as connected at its lower end loosely to a brake-frame $e^{12}$, pivoted at $e^{13}$ upon a vertical stud and having a preferably spring-like shoe or face $e^{14}$. The shaft $e^8$ has also fixed to it the hub of a monitor-lever $f$, (see Fig. 25,) having a toe $f'$, by which through the chain $e$ the said rock-shaft may be turned when it is desired to actuate the controller $d^2$ and the brake $e^{12}$. As herein shown, the hub 12 (see Fig. 25) of the monitor-lever $f$ has mounted on it loosely the hub of the monitor-lever $f^2$, of elbow shape, its short arm being provided with two toes 13 14, which embrace the toe $f'$ of the lever $f$. Loose on the shaft $e^8$ is another monitor-lever $f^3$ of elbow shape, (see Figs. 5 and 23,) connected by link $f^4$ with the projection $b^{14}$ of the raceway $b^{13}$, before described, the said lever having a toe 15 to bear upon the chain $e'$, the sole purpose of which is by or through the links of different heights to effect the ascent and descent of the raceway, as desired, to make the loops of the desired length, according to the part of the stocking being knitted, a spring $f^5$ acting normally to keep the toe against the said chain.

Prior to this invention it has been customary to raise and lower a needle-bed to make the loops longer or shorter, but a conical bed could not rest upon a cam-ring and be raised and lowered thereby, and yet preserve the proper relative operative positions of the co-operative parts. Hence the raceway herein provided for or some independently-controlled equivalent device becomes an essential feature in a machine having a conical needle-bed. The shaft $e^8$ also serves as the fulcrum for another monitor-lever $f^6$. (Shown in position in Fig. 3.) The lever $f^6$ is of elbow shape and has its lower arm connected by link $f^7$ (see Fig. 3) with an arm $f^8$ of a vertically-arranged rock-shaft $f^9$, having a second arm $f^{10}$, connected by a link $f^{12}$ with an arm $f^{13}$ of a rock-shaft $f^{14}$, having at its other end a double-ended segment $f^{15}$, which at is opposite ends engages, respectively, pinions $f^{16}$ and $f^{17}$, (see Fig. 2,) provided, respectively, with eccentrics $f^{18}$ and $f^{19}$, (see Fig. 14,) so that when the said double-ended segment is moved by or through the pattern-surface the said eccentrics will be put into one of their three positions, so that, acting in suitable slots of pawl-carriers $m$ $m'$, to be described, one having two pawls 26 27 and the other two pawls 28 29, either the pawls 26 and 29 or the pawls 27 and 28 will be put into acting position, according to the direction it is desired to move the stop-rings, as will be described, or to put the pawl-carriers in such position that both of the pawls will be in their inoperative positions.

The lower end of the monitor-lever $f^2$ has attached to it a rod $g$, provided with a pin or projection $g'$, the outer end of the said rod being passed through a hole in the outer end of a shipper-lever $g^2$, pivoted on a substantially upright pivot $g^3$, and having a double-belt fork at its opposite end, the outer end of the belt-shipper having attached to it one end of a spring $g^4$, which at its other end is connected to said rod, the said spring acting normally to keep the belt-shipper in such position as to enable the belts $g^6$ $g^7$, controlled by it, to be kept upon the loose pulleys $g^8$ $g^9$, located at opposite sides of the tight pulley $g^{10}$, fixed on the lower shaft $g^{12}$. When the driving-belt $g^6$ is on the tight pulley, the cam-ring will be rotated for circular or all-around knitting, but when the belt $g^7$ is on the said tight pulley the said cam-ring will be reciprocated for narrowing and widening. The power-shaft $g^{12}$ has a pinion $h$, which engages a spur-gear $h'$, fast on the main shaft $e^7$. This main shaft has also fast upon it a disk $h^2$, (shown best in Fig. 7,) it having a notch 16 and having a portion of its periphery cut away, as at 17, and having an attached flange or plate $17^\times$ extending from the disk at the side of its cut-away portion. Loosely mounted on the hub of the disk $h^2$ is a gear-wheel $h^3$, (shown detached in Fig. 9,) the said wheel being herein designated as the "cam-ring" driving wheel. This wheel $h^3$ has at its inner side suitable guides 19 20 for a sliding plate or carriage $h^4$, slotted to embrace the hub of the said wheel, and having at one end a coupling-pin 21 and at its other end a projection, preferably in the form of a roller, as 22. The plate $h^4$ has connected to it suitable springs $h^5$, (best shown in Fig. 9,) which act normally to keep the roller 22 out beyond the flange $23^\times$ of the said wheel and in range of the shoe $e^{14}$ of the brake $e^{12}$ when the latter is in its operative position, as will be described. Loose on the shaft $e^7$ and embracing, as represented, the disk $h^2$ is a vibrator $h^6$, having a notch 23, (shown best in Fig. 8,) which is adapted to be entered by the coupling-pin 21. The vibrator has pivoted upon it at $h^7$ a locking-dog $h^8$, the front end of which forms one side of the notch 23, a spring $h^9$, connected to the vibrator, normally acting upon the end of the said dog to keep its front end in the position shown in Fig. 8. When the coupling-pin 21 is in the notch 16 of the disk, the latter assumes control of the wheel $h^3$ and rotates it so that it, in engagement with a pinion $h^{10}$, fast on the shaft $h^{12}$, rotates said shaft, causing its bevel-gear $B^3$ to be rotated and rotate the cam-ring for circular knitting; but when the coupling-pin is in the notch 23 of the vibrator, then the vibrator assumes control of the wheel $h^3$, causing it, in engagement with the said pinion $h^{10}$, to oscillate the shaft $h^{12}$ and its attached bevel-gear $B^3$ and reciprocate the cam-ring for reciprocating or heel-and-toe knitting, the disk $h^2$, fast on the shaft $e^7$, rotating in the meanwhile within the oscillating vibrator. The vibrator has a stud $k$, which by connecting-rod $k'$, Fig. 2, is jointed to an adjustable pin $k^2$ of an arm or crank $k^3$, fast on a rotating shaft $k^4$, said shaft having a spur-wheel $k^5$, which is engaged and rotated by an intermediate gear $k^6$, engaged and rotated by the spur-gear $h'$, Fig. 5, fast on the shaft $e^7$, the rotations of the shaft $k^4$ through the connections described moving the vibrator continuously.

The shaft $h^{12}$ described has fixed upon it at one end a pinion $k^7$, which engages two gears $k^8\ k^9$, (see Fig. 14,) fast on like hubs $k^{10}\ k^{12}$, mounted on like studs $k^{13}\ k^{14}$, held in a hanger $k^{15}$, depending from the bed-plate A'. The hub $k^{10}$ has attached to it two cams $k^{16}\ k^{17}$, (see Fig. 15,) while the hub $k^{12}$ has like cams, only the outer one $k^{18}$, however, being shown. The hubs are rotated or reciprocated according as the shaft $h^{12}$ is rotated or reciprocated. The cam $k^{16}$ actuates the pawl-carrier $m$ (see Fig. 14) and the cam $k^{18}$ the pawl-carrier $m'$, before described, the said cams contacting with suitable roller or other studs mounted upon the pawl-carriers.

To enable the reciprocating movement of the pawl-carriers to be arrested when circular knitting is being done, I have provided the lower ends of the said carriers with legs 32, having feet 33, which, when the pawl-carriers are elevated by the cams $k^{16}$ and $k^{18}$, the eccentrics referred to at such time being in position to hold both sets of pawls out from engagement with the change-wheels $k^{22}\ k^{23}$, will cause the feet to ride up and lodge upon the upper ends 34 of stilts 35, the said stilts keeping the pawl-carriers elevated until they are moved aside in one or the other direction by the eccentrics referred to to bring one or the other pawl of the pawl-carriers into operative position to engage and rotate the change-wheels $k^{22}\ k^{23}$. Viewing Fig. 14, it will be seen that the pawls 26 and 29 on the pawl-carriers referred to are operative and at such time the pins on the rings $b\ b'$ are supposed to be moving away from each other for widening; but if the two pawls 27 and 28 were in operative position, then the said pins would be made to approach each other for narrowing. These change-wheels are fast, respectively, upon the hubs of gears $n\ n'$, (see Fig. 15,) mounted on shafts $n^2\ n^3$, the gear $n$ engaging the stop-ring $b^9$, while the gear $n'$ engages the stop-ring $b^6$, the motions imparted to the said gears during the reciprocating motion being exactly opposite, a suitable friction device or drag, as $n^4$, (shown in Fig. 15 as a spring,) acting to prevent any overrunning of the motion of the said gears. Each change-wheel is engaged by a locking rod or bar, as $n^5$, one of which bars is shown in section in Fig. 15, it being represented as provided with a roller or other stud $n^6$, which is acted upon by the cam $k^{17}$, the said locking-rod engaging and locking the change-wheels after they have been moved by the pawls.

The pattern-chain $e$ (see Fig. 28$^a$) has links or projections of different height, and the entire length of the said chain, as well as the chains $e'\ e^2$, are used during the formation of a stocking, chains of different length being employed, according to the length of the stocking. The lever $f^2$ operates the belt-shifter before the lever $f$ operates the shaft $e^8$ to put the shoe, Fig. 6, in position to operate the change-gear.

The chain $e$ has links of two different heights, and when the highest links act on the toe 13 the monitor-lever $f^2$ causes the movement of the shipper-lever to put the belt $g^7$ on the tight pulley $g^{10}$; but when the short links come under the toe 14, then the monitor-lever $f^2$ is moved in the direction to cause the shipper-lever to put the belt $g^6$ on the tight pulley $g^{10}$. It is obvious that this chain might be provided with links of an intermediate length to cause the belt-shipper to be moved to such extent as to retain both belts $g^6\ g^7$ on the loose pulleys, such position of the shipper being called for at the completion of a stocking, so as to automatically stop the machine, if desired, which would be the practice in case the stockings being knitted were knitted upon rib-tops transferred upon the needles; but when the machine is used to knit a tube having heel and toe bulges, as before referred to, then it is preferred that the machine continue in operation indefinitely.

The chain $e'$, (shown best in Fig. 23,) instrumental only in governing the length of the stitches, as described, has links of various height. The links embraced by the bracket $o$ will act upon the toe 15 of the monitor-lever $f^3$ when the top or large part of the leg of the stocking is being knitted, the said toe acting upon the portions of the chain included in the bracket $o'$ while the lower part of the calf and ankle are being knitted, and the leg having been knitted the parts of the chain included in the bracket $o^2$ will act under the toe 15 to effect the lengthening of the loops for narrowing and widening in the heel, and the heel having been knitted the part of the chain included in the bracket $o^3$ will come into operation, effecting a shortening of the loops in the foot, and thereafter, as the toe is to be commenced, the portion of the chain in the bracket $o^4$ will come into operation and again lengthen the loops, for the purposes described.

The chain $e^2$ (see Fig. 28) will have links of three different heights, those of one length, acting through the monitor-lever $f^6$ and its connections, moving the eccentrics referred to, so as to enable the pawls 26 and 29 to be operative in the racking motion, another height of links enabling the pawls 27 and 28 to be operative in the racking motion, while an intermediate height of links will cause the eccentrics to be put into such position as to prevent either set of pawls referred to from operating the change-wheels. The snail-wheel $e^6$ has at one side a projection $e^{60}$, (see Figs. 5 and 24,) which during the rotation of the said snail-wheel strikes the lower end of a lever $e^{61}$, mounted on an annular disk $e^{62}$, slotted at $e^{63}$, to embrace the sleeve-like hub $d^{14}$ before referred to, through which is extended the shaft $d^{12}$. The said annular disk $e^{62}$ has a second slot $e^{64}$, which receives a pin $e^{65}$, stationary with relation to the framework. The disk also has a toe $e^{66}$, which during the movements of the chain $e^2$ may be struck at its bevel side by a laterally-extended projection $e^{68}$ (see Fig. 29$^b$) or pin carried by the said chain to thus lift the disk and cause it to elevate the lever $e^{61}$ until its upper hooked end $e^{67}$ meets the projection $b^{14}$ from the raceway $b^{13}$. (See Fig. 23.) It is during the time that the projection $e^{67}$ is in engagement with the projection $b^{14}$ that the cam $e^{60}$ works to vibrate the lever $e^{61}$ and cause the raceway to be moved in the direction to raise the same and enable the stitches to be elongated or lengthened sufficiently to form a slack course. The projection $e^{67}$ keeps up its engagement with the projection $b^{14}$ always for a sufficient length of time to enable the cam-ring to rotate once, thus making a slack course, and the chain $e^2$ may have pins located upon it to operate, as described, whenever a slack course is desired. The spring $f^5$ aids the descent of the ring $b^{13}$; but it would descend by gravity.

In practice in the operation of the chains $e\ e'\ e^2$ referred to the speed of the chains is such that the cam-ring makes several revolutions while each link of the chain is in operative position.

The slack-course device may be omitted altogether when long stockings are being made; but it will be used when socks are being knitted.

The slack-course device is divorced from the chain $e'$ for the reason that it would be impossible to make with a short chain such as herein used a single-slack course, for, as stated, a number of revolutions of the machine takes place with each link of the chain; but by the slack-course device, as described, a single course may be made slack at any desired point in the knitting.

I will now describe the thread-changing mechanism, by which either an entirely different thread may be inserted in the heel or toe to the exclusion of any other thread, or whereby an extra reinforcing-thread may be added to the main thread used in the stocking. Figs. 30 to 33 show this thread-changing apparatus, and, referring to said figures, $D^\times$ represent a frame attached to the table-plate $A^\times$.

$B^\times B^\times$ are two rollers, preferably corrugated and held lightly pressed together by a suitable spring, as $p$, acting upon the bearings for one of the said rolls, the bight of the said rolls being directly over the center of rotation of the cam-ring. The frame $B^\times$, referred to, supports a shaft $C^\times$, having a sprocket-wheel $g^{41}$, (see Figs. 1 and 5,) which in practice will be driven by a sprocket-chain $C^2$ from a sprocket-wheel $g^{40}$, fast on the power-shaft $g^{12}$, the said shaft $C^\times$ being revolved constantly and at the speed of the cam-ring when the latter is being rotated for circular work.

D D' are two disks secured to the shaft $C^\times$, the said disks having cam-grooves and cam-plates, substantially as shown in the drawings.

F' is a connecting-piece slotted to straddle the hub $C^\times$ and to be guided by the hub of the disks surrounding it as the said connecting-piece is reciprocated longitudinally or toward and from the center of the machine, the said connecting-piece having a rigid pin G'. The rear end of the said connecting-piece is embraced by the forked upper end of a projection 60, extended upwardly from the monitor-lever $f$, the said projection by its action upon the said connecting-piece moving it laterally or either to one side or the other of the space between the disks D D', according to the action of the high or low links of the monitor-chain $e$, the fork at the same time allowing the said connecting-piece to reciprocate freely toward and from the center of the machine.

I' is a rack attached to the frame $D^\times$ in such way that it can slide in and out from the center of the machine. This rack engages with a pinion J', fastened to and so as to operate a shaft K', to which is attached a spur-segment L', which engages and operates the pinion M', secured to the hollow shaft N', the said shaft having hinged to it two yarn-arms $O^9\ P^9$ to guide two yarns. (See Fig. 30$^b$.) To the bottom end of the shaft K' is attached a pinion O' (see Fig. 33) by means of friction only, suitable check-nuts being provided, the tightening and loosening of which adjusts such friction by causing the like washers R' to be more or less pressed between the surface of the pinion O' and a collar S', solid on the shaft K'. The pinion O' engages with racks T' and U', provided, respectively, with arrow-headed cams $p^2$ $p^3$. The rack T' has a projection $p^4$ near its rear end. (See Fig. 30°.)

$p^5$ and $p^6$ are shears so constructed that they may be closed to cut the thread by forcing between their rear or hinged ends either of the arrow-headed cams $p^2$ or $p^3$, suitable springs $p^7$ $p^8$ being provided to open the shears after they have been closed and the cams closing them have been withdrawn. The screw $p^9$ acts as a fulcrum for the shears. Between the head of the screw $p^9$ and the blades of the shears is a washer $p^{10}$, preferably of rubber, which enables the shears to be held together at all times closely, so as to cut the thread cleanly; but instead of the rubber spring any other spring might be used.

The hollow shaft N' (see Fig. 30$^b$) is bored or constructed to form two passage-ways, one for the passage of the thread $p^{12}$, employed during circular knitting, and the other for the passage of the thread $p^{13}$, which may be either the reinforcing or an independent thread to be employed only in the heel and toe. The thread $p^{12}$ is passed through the yarn-arm O$^9$, while the thread $p^{13}$ is passed through the yarn-arm P$^9$. The thread $p^{12}$, as shown in Fig. 30$^b$, is so held by the arm O$^9$ that it is kept from contact with the rollers B$^\times$ and B$^\times$, so that they cannot engage the said thread while in the position shown in Fig. 30$^b$; but at that time the end of the thread $p^{13}$, which is not being knitted, but is in the arm P$^9$, is grasped between the said rollers.

As the present machine requires the introduction of a separate thread, as $p^{13}$, when knitting the heel and toe, the timing of the introduction of said thread is determined by the pattern-chain $e$ and lever; but the introduction of the thread is not intended to be limited to any one particular spot, nor is it intended to limit this invention to any particular chain for determining the time for introducing an extra thread. When a high link in the chain $e$ (a link such as will effect the production of reciprocating knitting) is used, the monitor-lever $f$ will tilt the fork or projection 60 and move the end of the connecting-piece F', so that one end of the pin G' thereof will be withdrawn from the cam-groove $q$ of the disk D and the other end of the said pin will be brought into the cam-groove $q'$ of the disk D'. These disks revolving as before explained, the pin G' remains in the groove $q'$ only long enough to allow the knitting to arrive at the exact point where it is desired to introduce the thread $p^{13}$. The position of the disk D' on the shaft C$^\times$ having been adjusted for this purpose at the moment when the change of thread is to be commenced, the cam $q^2$ comes in contact with the pin G' and compels it to travel along its inclined surface until the pin reaches the outside circumference of the disk D'. This operation draws the connecting-piece F' and its attached rack I' out the full length of their stroke in a direction away from the center of the machine, and during this operation the pinion J', shaft K', spur-segment L', pinion M', hollow shaft N', thread-arms O$^9$ P$^9$ are moved with the following results, viz: The cam $q^3$, attached to the spur-segment L', is withdrawn from the guide trip-lever $q^4$, pivoted on the frame, which allows the arm O$^9$ to be brought opposite the center of the rollers B$^\times$ and B$^\times$ by the spring $q^5$, while the action of the spur-segment L' on the pinion M', to which the guides are connected by means of the hollow shaft N', causes the thread-arms to revolve, thus twisting together the two threads while held by and passing between said rolls to form, as it were, a single thread. The traveling knitting or leg thread $p^{12}$, twisted with the thread $p^{13}$ and put into position between the rollers B$^\times$ and B$^\times$, as stated, causes the circumference of the said rolls by the action of the said thread thereon to travel at the speed of the thread $p^{12}$, and thus draw down between the rolls and from the arm P$^9$ the thread $p^{13}$, previously twisted around the running thread $p^{12}$, this running together of the two threads continuing until the end of the thread $p^{13}$ reaches the knitting-needles, the two threads being knitted in together for the space of a few needles.

In the movement of the parts as before described and during the operation above stated the thread-arms O$^9$ and P$^9$ are revolved, so as to twist the threads together, and the thread-arm P$^9$ has by the gearing, suitably proportioned, been left in the position previously occupied by the thread-arm O$^9$ and the arm O$^9$ occupies the position previously occupied by the thread-arm P$^9$. A reversed cam $q^6$, similar to the cam $q^3$ and carried by the gear-segment L', is adapted to engage with the trip-lever $q^7$ at the end of the motion of the gear-segment described to bring the arm P$^9$ into its outer or tipped position, so that the thread $p^{13}$, which is now running through it, is guided out from contact with the rollers B$^\times$ and is placed out of reach of the shears. This done, the shears are actuated to close and cut the leg-thread $p^{12}$, that at this time is running between and acting to revolve the rollers, the revolution of the rollers being stopped as soon as the leg-thread is cut, the rollers thereafter acting to hold the end of the leg-thread out of action. Before a high link of the chain $e$ acted to move the forked connection 60 to produce the movements above described the arrow-pointed shear-cam $p^3$ occupied the position (see Fig. 30°) between the handles or rear ends of the shears, thus keeping their front ends closed; but on the first movement of the shaft K' the pinion O' was driven by the friction connection described, so as to withdraw the said cam $p^3$ from between the handles of the shears, so that the shears were immediately opened by their springs, allowing the threads that had commenced to twist and run into and between the center of the rolls to pass down together to the needles. The motion of the pinion O' in engagement with the racks T' U' in withdrawing the cam $p^3$ advances the cam $p^2$ toward the point of contact of the handle parts of the shears; but the completion of the movement of said cam $p^2$, which otherwise would effect the closing of the shears too soon, is stopped by the projection $p^4$ coming in contact with the revolving stop $p^{10}$ (see Fig. 30) on the disk D, thus allowing the shaft K, by means of the friction connection, to complete its movement without, however, moving the pinion O', and hence the cam $p^2$, far enough to close the shears, thus giving the arm $p^9$ sufficient time to remove the heel-thread carried by it out of the reach of the shears, which is done by tipping the carrier, as before described. The shaft K' now being stationary, no further movement of the pinion $q'$ and shear-cams $p^2$ $p^3$ can occur from this source. The shears are closed when all movement of the thread-carriers has ceased and at the exact moment required in the knitting by the outer edge of the adjustable cam $p^{120}$ coming in contact with the projection $p^4$, causing the movement of the racks T' and U', allowed by the friction connection of the pinion O', and forcing the cam $p^2$ into position to close the shears at the time and in the manner previously referred to.

To prevent the loose end of the newly-introduced heel-thread from separating from the running thread in passing through an ordinary thread-guide hole preparatory to reaching the needles, the threads will be guided, preferably, over grooved pulleys $d^7$ $d^8$ at the points desired, said pulleys helping by their rolling action, as described, to increase the adhesion of the threads and prevent them from untwisting.

The knitting of the heel having been completed, the change back to the leg-thread for the purpose of knitting the foot is accomplished as follows, viz: One of the links of the chain $e$, instrumental in establishing the rotary motion of the cam-ring, will act and cause the forked arm 60 to move the pin G' from its position at the circumference of the disk D' into a similar position with relation to the circumference of the disk D. The machine continues to revolve, and at the moment when the change of thread is to be commenced the cam $r$ of the disk D (see Fig. 32) comes in contact with the said pin G', compelling it to travel into the groove $q$. This operation causes the movement of the connecting-piece F' and the rack I' the full length of their stroke toward the center of the machine, producing in all the parts previously referred to movements correspondingly reverse to those previously described, resulting in again bringing the arms O$^9$ and P$^9$ and their threads into their first normal position or the position occupied for circular knitting. In this reverse operation of the parts the shears are stopped from closing at the wrong time by the projection $p^4$, it moving inwardly and coming in contact with the revolving stop $r'$, but are closed at the proper time by the action of the inner edge $r^2$ of the cam $p^{120}$.

When it is desired to continue the knitting of the leg-thread during the knitting of the heel, so as to knit into the heel the two threads, one being called a "reinforcing-thread," it is necessary to remove the cam $p^2$ from the rack T', so that the shears will not close on the leg-thread, and to provide the gear-segment L' with an additional cam-finger $r^2$ (shown in Fig. 34) to come in contact with the tripping-lever $q^7$ so as to trip the thread-arm P$^9$ out to guide the running-leg thread from between the rollers while knitting the heel.

In the method herein explained, wherein the arms are rotated, the bobbins standing still, the hollow shaft N' has to be revolved for the purpose of twisting the threads below the arms, and at the same time the thread will also twist together above the hollow shaft unless means are provided to prevent. To prevent this twisting of the threads above the shaft and between it and the taker-up lever 102, I have provided a series of guiding-sleeves 103, which are coupled together by suitable connecting-pieces 104, so that the sleeve nearest the gear M' will partake of part of a revolution before the next connecting-piece above it will commence to move, and so on. The combined effect of these several thread-guiding sleeves and connecting-pieces allows the hollow shaft N' to partake of the desired number of revolutions without rotating the uppermost connecting-piece 104, attached to the stationary arm 105 immediately below the taker-up lever 102, as shown in Fig. 26. In this way the threads twisted together by the hollow shaft N' are kept separated, though they assume a spiral position. When the shoe of $e^{14}$ of the brake $e^{12}$ is swung around into the range of movement of the roller 22, attached to the slide $h^4$, which movement is effected by the rock-shaft $e^8$, preparatory to changing from circular to reciprocating knitting, the said roller strikes the said shoe and forces the slide $h^4$ in a direction to cause the coupling-pin 21 to move out from the notch 16 of the disk $h^2$ and against the inner edge of the locking-dog $h^8$ near its pivot. The said pin thereafter sliding along said dog presses the dog outwardly against the stress of the spring $h^9$, the pin 21 finally passing beyond the end of the said locking-dog into the notch 23 of the vibrator, the free end of the dog then flying back into locking position behind the said pin. The speed of the disk $h^2$ and the speed of the vibrator in the same direction at and about the time that the pin is to finally leave the notch 16 and enter the notch 23 is the same, thus enabling the said pin to readily pass from one into the other notch. After the pin 21 has entered the notch 23 the vibrator, in its movements in the direction of rotation of the disk $h^2$, due to its crank motion, permits the notch 16 to pass beyond the notch 23, thus bringing the plate $17^x$, attached to the wheel $h^2$ in position to close the notch 23 in the vibrator and effectually inclose the pin 21 in the said notch 23.

To change from reciprocating to rotary motion, the brake-shoe will be thrown aside out of the range of movement of the roller 22, thus letting the slide move in the direction to withdraw the pin 21 from the notch 23, which will be done at that portion of the stroke of the vibrator when the notch 23 comes opposite the notch 16 in the disk $h^2$, it in its rotation arriving once during each rotation of the shaft $e^7$ opposite the said notch 23.

The means herein shown for effecting the oscillation or reciprocation of a shaft are applicable to other than knitting-machines where such a motion is required.

I desire to have it understood that the parts of my machine above the bed-plate could be used to equal advantage with any suitable or well-known reversing mechanism to control the rotation or reciprocation of the shaft $h^{12}$.

The spring-shoe connected with the brake insures positive contact between the pin 21 and the edge of the locking-dog and aids in putting the pin 21 quickly and securely into the bottom of the notch 23 of the vibrator.

I have provided the machine with a rock-shaft $s$, having at one end a handle $s'$ and at or near its other end an arm $s^2$. By turning this rock-shaft $s$ by hand in the direction to cause its arm $s^2$ to engage by its beveled portions the shipper-lever between its fulcrum and the belt-guiding surfaces the said shipper-lever may be put into its central position, as in Fig. 5, and be there held and keep the two belts on the two loose pulleys, the shaft $g^{12}$ being at such time at rest. When the rock-shaft $s$ is turned by hand in the direction to release the belt-shipper, said shipper by or through the spring $s^3$, attached to the short arm of the lever $f^2$, and the spring $g^4$, will move the shipper-lever to the right or left, as demanded by the links of the monitor-chain $e$ at that time, thus putting one or the other of the belts onto the tight pulley, according to whether circular or reciprocating knitting is to be done. The gear-wheel $k^7$ on shaft $k^{12}$ is of such size with relation to spur-wheels $k^8$ $k^9$, actuated by it and employed for moving the cams $k^{16}$ and $k^{18}$, that the said cams will not receive a full rotation during one full reciprocation in one direction of said gear $k^7$ or during one reciprocating stroke of the cam-ring. The cams $k^{16}$ and $k^{18}$ are so shaped, placed, and moved that during one reciprocation of the gear-wheel $k^7$ in one direction but one of said cams can act to reciprocate a pawl-carrier and move a stop ring or rack controlling a tripping-pin, the ring or rack so moved being the one controlling the tripping-pin situated across the machine from the position then occupied by the cam $c^6$, and consequently the said cam cannot strike the tripping-pin when not locked. The locking of the stop-rings, and consequently of the tripping-pins controlled by them when the said pins are to be struck by the cam $c^6$, is effected by like cam-wheels $k^{17}$, arranged just behind the cam-wheels $k^{16}$ $k^{18}$, the notches in the wheels $k^{17}$ being so adjusted with relation to the depressions in the cam-wheels $k^{16}$ $k^{18}$ that when a pawl-carrier is descending the locking rod or bar co-operating with it will descend and effect the disengagement of its point from a notch in the change-wheel; but after the pawl-carrier has risen and moved the change-wheel one notch, then the locking rod or bar will be lifted to engage and securely lock the change-wheel until that particular change-wheel is to be again unlocked and rotated, and it is while the change-wheel, and consequently the stop-ring controlled by it, is thus held in locked position that the cam $c^6$ meets the trip-pin co-operating with said stop-ring.

The change-wheels $k^{22}$ and $k^{23}$ are made detachable from the gears used in connection with the stop-rings, so that change-wheels having any desired gage or pitch of teeth or number of notches may be used, for it is necessary to employ change-wheels having their teeth gaged or pitched to correspond with the gage of the needle-bed used.

I may employ in one machine any number of conical cylinders of different length, and each length of cylinder may be grooved for any gage of work and size of needle.

While I have been able to gain excellent results by the employment of the racking devices shown to move the stop rings or bars intermittingly, first one and then the other, in the required direction to put the tripping-pins in the different positions required to enable the cam $c^6$ to be oscillated and put the guiding-gates into proper position to elevate in usual and proper sequence the endmost needles of the series of needles used in narrowing and then lower the said needles in widening, I wish it to be understood that other well-known or suitable racking devices might be employed to control the gradual approach and separation of the tripping-pins and to hold the said pins from undue motion when struck by the cam $c^6$ without departing from this invention.

Just below the active side of the main drawing-down cam $a^{24}$ (see Fig. 21) I have provided the cam-ring with a false face $t$, acted upon by a spring $t'$, the said face serving to press lightly on and keep against the acting edge of the drawing-down cam the butts of the needle, such action overcoming the tendency of the butts of the needles when the machine is being run at high speed to break their contact with the cam, or, in other words, the false face referred to prevents any descent of the needles solely by momentum or farther than they would be pushed by actual contact with the drawing-down cam. Without this false face differences between very high and slow speed of the cam-cylinder would effect a difference in the tension of the knitting. The shape of the cam-surface for moving the sinkers is such as to cause the hooks $B^6$ thereof to be thrown back, as at the left in Fig. 18, when the hook of a needle is about to draw a new loop through an old one; but before the needle starts to rise the sinker is moved into the position shown at the right in Fig. 18, so that the said hook $B^6$ meets the fabric and keeps it down as the needles rise. The sinkers are made as levers of the first order, and they are compactly arranged in notches of the needle-bed between the grooves which receive the needles, and the said sinkers are arranged almost wholly outside the needle-bed upon fulcra supported at the outer side of the needle-bed, and the cam for actuating the said sinkers is also arranged wholly outside the needle-bed, so that the interior of the needle-bed is left wholly open for the free passage through it of the knitted material.

Prior to this invention many different forms of machines have been provided with sinkers of various different shapes; but prior to this invention I am not aware that a sinker made as a lever of the first order has ever been employed in connection with and supported upon a fulcrum carried by a circular needle-bed at its outer side or face, the upper ends of the sinkers being guided in slots at the upper end of the needle-bed, or that a sinker has ever had a seat at its end, as described. The thread during reciprocating knitting has to be controlled by a take-up.

In this invention the knitting-threads, after leaving the usual bobbins or cops of large carrying capacity, pass through a guiding-sleeve $t^4$ and between the preferably corrugated face of a movable brake 100 and the preferably corrugated face of a rest 101, a spring $101^{\times}$ acting normally to keep the brake on the yarn. After passing over the brake the yarn passes through an eye $102^{\times}$ at the outer end of a take-up lever 102, pivoted at $t^5$ on a frame 111, adjustably attached to a suitable rod or shaft 112, sustained at a point above the framework. From the eye of the take-up lever the thread is passed down through an eye in a block 103 to the thread-presenting mechanism previously described. In the process of knitting when the strain of the yarn on the eye $102^{\times}$ is sufficient to pull down the outer end of the take-up lever the said lever then meets the outer end $104^{\times}$ of the brake and releases the yarn, enabling it to be drawn freely through the brake, as required by the work. As soon, however, as the yarn is slackened, due to the reversal of the cam-ring, the spring $105^{\times}$, pulling on the take-up lever at its rear end, raises the eye $102^{\times}$, thus taking up the slack yarn, the brake closing on the yarn as the eye rises and preventing further delivery of the yarn. When circular knitting is being done, it is desirable to release the running thread from the action of the brake. To do this, I have provided a lever 106, pivoted at 107 on a rigid part 109 of the take-up framework. The outer end of this rod will in practice be joined by a rod $107^{\times}$ with an ear $t^6$ on the monitor-lever $f^2$ or with some other suitable monitor-lever or actuating device suitably timed. However actuated, the lever 106 will be moved when the machine is to be changed from reciprocating to rotary knitting in such direction that the inner end of the said lever by or through a connecting device, (shown as a bar 108, slotted near its upper end to embrace a pin or projection 110 of the clamp 100,) will open the clamp and let the yarn be delivered freely, as required.

It is very essential in machines of the class described that the action of the take-up upon the knitting-threads be uniform throughout, and great difficulty has been experienced in providing a take-up lever with a spring which will operate suitably, for in such plans heretofore known to me the stress upon the spring has been very variable during the stroke of the take-up. To overcome this, I have devised means whereby the line of force of the spring may recede from or approach toward or from the fulcrum of the lever when the latter is moving, and I have provided means for adjustably connecting the spring with the lever that this action referred to may be increased or diminished at will. To accomplish this, I have provided the take-up lever with a quadrant 115, having suitable holes or projections, with which may be connected one end of the spring $105^{\times}$ of any desired strength, heavy and light springs being used according to the yarn being knitted, the lower end of the spring being attached to a suitable fulcrum-pin $t^7$, herein represented as forming part of the lever 106. The reinforcing-thread $p^{13}$, before referred to, may be led through a guide alongside of the guide $t^4$ and between the clamp and then be passed through a second eye $t^8$, controlled by the take-up lever. This is of especial advantage for the reason that the reinforcing-thread is enabled during the knitting of a heel or toe to withstand part of the strain of the action of the take-up instead of putting all the strain of the take-up upon the leg-thread alone during such operation. I have previously described the manner of partially rotating the raceway $b^{13}$ by or through the chain $e'$ and the monitor-lever $f^3$.

Referring now to Fig. 23, it will be seen that the monitor-lever has a series of holes $t^9$, into any one of which may be entered the pin $t^{10}$, employed to connect the link $f^4$ with the said lever. The adjustment of this link upon the upwardly-extended arm of the monitor-lever enables me to employ course or fine yarns without any change in the height of the links of the chain. When the guiding-gates are in their elevated position, (shown in Fig. 21,) the butts of the needles in the groove $a^9$ as the cam-ring is moved over said butts will be struck by one or the other edge of the directing-cam, and will by said cam be directed into the knitting-groove $a^{30}$, to be acted upon by the drawing-down cam, and be then lifted to take yarn by one of the elevating-cams, the latches $a^5$ and $a^6$ enabling the passage of the butts of the needles from the knitting-groove into the non-knitting groove above the ledge $a$, the said latches closing the open space between said grooves and preventing the butts of the needles from entering the knitting-groove except at a point between the guiding-gates and by or through the instrumentality of the directing-cam. When the guiding-gates are in their depressed position, (shown by Fig. 21ª,) they close the passage between them into the knitting-cam groove, and the lower sides of the butts of the needles are acted upon by the upper sides of the guiding-gates.

When the machine is knitting, producing circular work, the cam-wheel $c^6$ will be held out of operative position or out of the range of the tripping-pins $b^2$ and $b^3$, and at such time the end of the yoke will pass between the shoes of the controller $p^2$.

In the commencement of a stocking, or when knitting a circular web such as described, to consist of tubular portions with bulged portions, when the first courses to constitute the top of the leg are being knitted, the belt $g^6$ of the machine will be on the tight pulley, and the toe 15 of the monitor-lever $f^3$ will rest upon one of the higher links of the chain $e'$, thus putting the tension-ring in position to cause the main drawing-down cam to form its long stitches, and at this time the take-up will be out of operation and only the leg-thread will be presented to the needles. The rotary motion of the machine will be continued, and during the movement of the chain $e'$ the monitor-lever $f^3$ will come upon some of the shorter links of the chain and move the raceway $b^{13}$ in such a manner as to shorten the stitches in the calf or ankle of the leg, as may be desired, to gradually contract that portion of the stocking, as may be desired, and during the last course of circular knitting preparatory to making the heel a suitable link on the pattern-chain $e'$ will rock the shaft $e^8$ to put into position the controller $d^2$, so that the yoke $c^{12\times}$ during a part of the last course of circular knitting will strike the shoe $d$ of the controller to put the cam $c^6$ into operative position, and as the said shaft $e^8$ is rocked it will move the brake described to put its shoe into the range of movement of the roll 22 described, so that the change may be effected, as described, from circular to reciprocating knitting at the completion of the said revolution. At this time, also, the thread-changing devices come into operation to effect the change of or addition of the second or reinforcing thread at the proper moment, as has been described. Now during the further rotation of the cam-ring in the direction of circular knitting and on its last course the slot 4 of the cam $c^6$ meets the tripping-pin $b^2$, which partially rotates the said cam, causing it by its cam-grades in engagement with the lever $c^3$ to move the guiding-gates from the position Fig. 21 into the position Fig. 21ª, so that one of the guiding-gates, as $a^7$, will pass under the butts of the needles toward which it is approaching and will enable them to be retained in the non-knitting groove $a^9$, the cam being rotated sufficiently far in the same direction to cause the butts of the needles which occupied a position in the knitting-groove when the guiding-gates were so moved to be passed under the drawing-down cam and carried out into the non-knitting groove, thus leaving all the needles, with their butts, in the non-knitting groove. In this condition the parts are ready for reciprocating knitting.

It will be noticed in this machine that the normal position of the needles when not directly reciprocated by the cams is with the needles elevated, and the needles not used in knitting the heel and toe remain in this position. Now as the cam-ring is reversed in its movement on its first stroke for reciprocating knitting the groove 5 of the cam $c^6$ as soon as it reaches the same tripping-pin $b^2$ moves the cam in the direction opposite that which it was previously moved by the same tripping-pin and the ends of the guiding-gates are elevated into the position shown in Fig. 21. During the first part of the stroke of the cam-ring for reciprocating knitting and before the cam $c^6$ strikes the tripping-pin the butt of the needle last to pass the upper side of the guiding-gate $a^7$ is the first to strike the edge of the deflector next the said guiding-gate and rock the same, so that that needle and other needles following it will pass above the guiding-gate $a^8$ into the non-knitting groove, and about as the needle last to knit in the last circular course arrives at the deflector the cam $c^6$ by its slot 5 strikes the tripping-pin $b^2$, quickly shifting the needle-gates and putting them back into the position shown in Fig. 21, so that the needle next to the said last needle to knit on the said course is made to pass under the guiding-gate $a^8$ into the knitting-groove. The movement of the machine is continued in the same direction until the needles to be used in knitting the first course of the heel are brought into the knitting-groove, at which time the cam $c^6$ arrives opposite or in contact with the tripping-pin $b^3$ and the slot 5 of the said cam engages the said pin, causing the cam to be turned sufficiently to again put the guiding-gates down in the position Fig. 21ª, and thereafter in the further continuation of the first reciprocating stroke of the cam-ring the butts of the remaining needles in the non-knitting groove are made to travel above the guiding-gate $a^8$ into the non-knitting groove at the other side of the director and the movement of the cam-ring is continued in the same direction until the needles which were in the knitting-groove, as before described, are carried up into the non-knitting groove. This done, the machine is again reversed for a second course. The last needle to pass above the guiding-gate $a^8$, it being then in its depressed position, is the first to strike the opposite side of the director, turning it into the position shown in Fig. 21, causing the butts of the needles to pass the top of the guiding-gate $a^7$, which, it will be remembered, at such time is down, together with the gate $a^8$, and the needles will be run into the non-knitting groove until the needle last to take yarn and knit at the end of the first course in narrowing passes the director, at which time the slot 4 of the cam $c^6$ again strikes the tripping-pin $b^3$ and elevates the guiding-gates, so that the needle next to the one last to knit is thrown down into the knitting-groove, and so on. This operation is continued, and through devices already described the tripping-pins are made to approach each other, thus throwing out of action at the end of the series of needles used for making the heel one needle after another in succession on either side of the machine until the narrowest course of knitting is reached for the heel, and then by the racking motion the tripping-pins are gradually separated, thus changing the time of operation of the cam $c^6$ in shifting the guiding-gates, and the needles are gradually put into action one at a time on either end of the series of needles used in knitting the heel—that is, the needles which were lifted successively in shorter courses are brought down successively for longer courses until the widening is completed. During this operation of making the heel the tension or stitch was made long by suitable high links of the pattern-chain $e'$, for at such time the addition of a thicker or of a reinforcing thread requires for the best work the longer stitch. The widening having been completed, the thread-changing mechanism is operated at the proper time, as has been before described, to again bring into knitting position, the thread to be used in the foot of the stocking. The extra thread used in the heel is cut off automatically, the take-up is rendered inoperative and the rock-shaft $e^8$, having in its movements put the shoe $d'$ of the deflector into position to withdraw from operative position the cam $c^6$ the machine is started again on its roundabout or circular action and the further movements of the monitor-chain complete the change to move the cam-cylinder at its fastest speed. The foot of the stocking having been completed, the same operation is gone through with for the production of the toe as described for the heel, and the toe having been finished the circular motion is again commenced in the manner first described.

Should the machine be employed for making socks, the chain $e$ will have a link of suitable height to effect the putting of the belt-shipper into its central position with the two belts on the two loose pulleys after the completion of the toe of the stocking and the machine will be stopped, and the operator would then turn the cam sufficiently to bring the guiding-gates into position to place the butts of all the needles in the non-knitting groove with their hooks at the same level. At this time the combined latch-guard and thread-support would be turned back and the operator would pick on or transfer in suitable manner the loops of a rib-top, and then after returning the guiding-gates into the position shown in Fig. 21 or knitting position would turn back his yarn-guide, supply it with thread, lead the same to the hooks of the needles, and turn the machine a few courses by hand through a suitable handle provided for that purpose on the shaft $g^{12}$. This hand rotation of the machine brings the stopping-link of the chain referred to away from under the toe of the monitor-lever, and thereafter the shipper-lever will be properly moved to put the belt $g^6$ on the tight pulley and start the machine for circular knitting, the heel, foot, and toe being made automatically, as has been described.

It will be noticed that the conical bed herein shown has a cylindrical shaft projecting therefrom at a point near the upper end of the bed, leaving the lower end of the bed overhanging or projecting for a considerable distance beyond the vertical walls of the shank, the needle-cylinder being grooved for a considerable distance below the upper end of the shank, the shank being of sufficient length to receive a friction-plate which carries the cam-ring, the hub of the friction-plate rotating around the shank.

From the foregoing description it will be understood that the uppermost groove $a^9$—namely, that above the ledge $a$ and above the bars $a^3$ and $a^4$, the said bars having connected to their ends the latches $a^5$ and $a^6$—serves three purposes: First, it serves to receive the butts of all the needles used in circular knitting, except at the point where the cams act upon the butts of the needles to reciprocate them for knitting; secondly, to receive the butts of those needles which when reciprocating knitting is being done, as in the production of heels and toes, are not made to take yarn and knit, and, thirdly, to receive the butts of the needles when the latter are in their topping position.

Prior to this invention it has been customary to provide cam-rings with three different grooves or spaces, one of which may be designated as the knitting-groove, another a groove in communication therewith, in which the butts of the needles rest when not being directly acted upon by the cams, and a third or independent groove or space above the said grooves, in which stand the butts of those needles which are elevated or put entirely out of action and not to be used during the production of heels and toes.

In accordance with my invention and by reason of the peculiar construction of the grooves or pathways occupied by the needles and of the latches and needle-gates separating the level non-knitting groove from the knitting-groove, there being but two grooves, it is possible to rotate the machine and leave all the needles in the said level non-knitting groove and to automatically throw down and knit on all the needles for circular work or on any desired number of said needles required for heel and toe work. In the claims to follow, based upon this feature of my invention, I shall denominate as the "idle-level" that groove of the cam-ring which is capable of receiving and has at its bottom the ledge to sustain the butts of the needles in the three positions stated during the three operations hereinbefore described.

The method of operating the needles for narrowing and widening—that is, engaging their butts during the reciprocating movements of the cam-ring in one and then in another direction by the points of the guiding-gates, thus taking some needles from the entire series of needles, the butts of the entire series being at substantially the same level—is the same as practiced in the United States Patent No. 453,059.

The cam-ring is kept seated by means of a ring $T^{10}$, held in place by suitable screws $T^{12}$.

Having described my invention, what I claim as new, and desire to secure by Letters Patent, is—

1. In a knitting-machine, a conical needle-bed having an annular projection or rim extended around its surface near its smaller end to support a sinker-actuating ring, substantially as and for the purpose specified.

2. In a knitting-machine, a conical needle-bed having an annular projection or rim upon its surface to support a sinker-actuating ring and provided with an annular recess or groove above said rim and outside the bed to receive a wire, upon which the sinkers may be fulcrumed, substantially as and for the purpose specified.

3. In a knitting-machine, a conical needle-bed having an annular projection or rim and an annular recess or groove for the support of the sinker-fulcrum, and a sinker-fulcrum, combined with a series of sinkers and a sinker-actuating ring mounted on the said rim, to operate substantially as described.

4. In a knitting-machine, a conical needle-bed having a series of needle-grooves and a series of grooves between them to receive sinkers, combined with a fulcrum-wire supported by the said bed near its outer side and with a series of sinkers made as levers of the first order and mounted on the said fulcrum-wire, substantially as described.

5. In a knitting-machine, a conically-shaped needle-bed having a supporting-rim upon its upper side for the reception of a sinker-actuating cam and having at its inner side at a distance from its lower end a cylindrical neck, to operate substantially as described.

6. A conical needle-bed having a rim erected thereon between its ends and shaped to constitute a guide for a sinker-actuating cam-ring, said bed being grooved and slotted, as described, for the reception of needles and sinkers, a sinker-actuating cam-ring mounted and made movable and rotatable upon the said rim about said needle-bed, and a fulcrum-wire $A^9$, supported upon the outer side of the said bed in said annular groove, combined with a series of sinkers having each a slot or projection at one edge between its ends to slip over or embrace the said fulcrum-wire and having at one end a hook or point and below it a breast and having its other end located at a point below said fulcrum-wire and shaped to be acted upon by said sinker-actuating cam-ring, to operate substantially as described.

7. A conical needle-bed having a rim erected thereon between its ends and grooved and slotted, as described, for the reception of needles and sinkers, a fulcrum-wire supported upon the outer side of the said bed near said rim, and a series of sinkers having a slot or projection at one edge between its ends to slip over or embrace the said fulcrum-wire and having hooks or points, combined with a sinker-actuating ring mounted and made movable upon the said rim and provided with a removable portion, whereby any sinker may be readily withdrawn from its fulcrum when desired, substantially as described.

8. A sinker having at one end a breast curved as described and a hook and at one edge between its ends an open slot to co-operate with a fulcrum and shaped at its other end to be engaged and vibrated about its fulcrum by a cam, substantially as described.

9. A stationary conical needle-bed having a cylindrical shank connected therewith between its upper and lower ends and projecting at some distance below the lower end of the bed, combined with a friction-ring surrounding the said shank to rotate thereon and a cam-ring attached to the periphery of the said friction-ring and gearing to engage and move the said cam-ring, substantially as described.

10. A conical needle-bed having a projecting rim slotted for the reception of the needles, the said bed being also slotted for the reception of a series of sinkers, combined with a fulcrum-wire and a series of sinkers having slots to embrace the said fulcrum-wire, and with a sinker-actuating ring to act upon the outer ends of the sinkers to vibrate them and at the same time keep the sinkers seated upon the fulcrum-wire, substantially as described.

11. In a knitting-machine, a needle-bed having projections to serve as a rim or support for a sinker-actuating cam, said needle-bed being grooved for the reception of a series of needles and slotted through at its upper end, as at $A^4$, between adjacent needle-grooves for the reception and guidance of a series of sinkers, substantially as described.

12. In a reversible knitting-machine, a cam-ring having knitting and non-knitting grooves and right and left hand guiding-gates located in proximity to the junction of the said grooves, combined with an oscillating directing-cam pivoted between the points of the said guiding-gates and devices to actuate said gates automatically, to operate substantially as described.

13. In a reversible knitting-machine, a cam-ring having knitting and non-knitting grooves and its guiding-gates, combined with an angular oscillating directing-cam movable with said ring and a friction device to steady the movement of the said directing-cam, substantially as described.

14. In a reversible knitting-machine, a cam-ring having knitting and non-knitting grooves and needle-guiding gates, combined with an oscillating directing-cam fixed to a stem suitably journaled with relation to the cam-ring and provided with a stop by which the oscillating movement of the directing-cam is restricted, substantially as described.

15. In a knitting-machine, the combination, with a cam-ring and its main drawing-down cam, of a co-operating yielding false face located near the acting edge of said cam, to operate substantially as described.

16. A knitting-machine containing the following instrumentalities, viz: a conical needle-bed, a conical cam-ring having knitting and non-knitting grooves and needle elevating and depressing cams suitable for roundabout or circular and reciprocating knitting, and a directing-cam and guiding-gates and actuating devices to automatically operate the said gates during reciprocating knitting for narrowing and widening, substantially as described.

17. The cam-ring having knitting and non-knitting grooves and its attached right and left hand guiding-gates and lever for moving said gates, combined with a cam-controlled device to move said lever, substantially as described.

18. The cam-ring having knitting and non-knitting grooves and attached right and left hand guiding-gates, combined with a cam and means between it and the said gates to actuate the latter and means to automatically actuate said cam, substantially as described.

19. A knitting-machine containing the following instrumentalities, viz: a needle-bed to contain a series of needles, a cam-ring having knitting and non-knitting grooves and adapted to actuate the said needles, the said cam-ring carrying right and left hand guiding-gates and having a directing-cam pivoted between them, a gate-moving cam located outside the said bed, tripping-pins to actuate automatically the said cam, and means between the gate-moving cam and gate to actuate the latter, substantially as described.

20. In a reversible knitting-machine, a cam-ring having knitting and non-knitting cam-grooves, right and left hand guiding-gates located in proximity to the junction of the said grooves, a lever connected to the said gates, a cam-wheel having a locking-block and adapted to move the said gate, combined with a spring to act against the block and hold the cam in position, substantially as described.

21. In a knitting-machine, the combination, with a cam-ring having knitting and non-knitting grooves and right and left hand guiding-gates and a lever for moving the same, of a cam-wheel, substantially as described, having two radial grooves and cam projections for positively moving the said lever, substantially as described.

22. A knitting-machine containing the following instrumentalities, viz: a needle-bed containing a series of needles, a surrounding cam-ring having knitting and non-knitting grooves and guiding-gates at its inner side and drawing-down and elevating cams, a gate-controlling cam located outside the cam-ring, means to reciprocate the cam-ring, connections between the gate-controlling cam and gates, tripping-pins, stop rings or racks, and means to automatically move them to move the said tripping-pins and put them into proper positions to operate the gate-controlling cam at the proper time to actuate the gates, as and for purposes set forth, during reciprocating knitting.

23. A knitting-machine containing the following instrumentalities, viz: a conical needle-bed having a projecting rim, a series of needles, and a series of sinkers supported upon the outer side of the said conical bed, a sinker-actuating ring mounted upon the said rim and adapted to actuate the sinkers, a cam-ring having knitting and non-knitting grooves and right and left hand guiding-gates and a director and drawing-down and elevating cams, a gate-controlling cam located outside the cam-ring, means to operate the sinker-actuating ring from the cam-ring, as described, means to reciprocate the cam-ring, connections between the gate-controlling cam and gates, tripping-pins, stop rings or racks, and means to automatically move them to move the said tripping-pins and put them into proper positions to operate the gate-controlling cam at the proper time to actuate the gates, as and for the purposes set forth, during reciprocating knitting.

24. A knitting-machine containing the following instrumentalities, viz: a stationary needle-bed to contain a series of needles, a rotating cam-ring having a movable drawing-down cam, an annular raceway presenting a level track and entirely surrounding the said cam-ring, means to move the raceway vertically, and connections between the said raceway and the said drawing-down cam, whereby the change in vertical position of the raceway effects the shortening and lengthening of the stitches, substantially as described.

25. A knitting-machine containing the following instrumentalities, viz: a stationary conical needle-bed to receive a series of needles, a rotating cam-ring containing a movable drawing-down cam, an annular vertically-movable raceway entirely surrounding the said cam-ring and presenting a level surface to constitute a track, and a lever carried by the cam-ring and having one end connected with the drawing-down cam and its other end adapted to ride upon the said raceway, substantially as described.

26. A sinker made as a lever of the first order and having a hook with a curved breast below and slotted at its under side and having a curved rear end notched, as described.

27. A knitting-machine containing the following instrumentalities, viz: a stationary needle-bed adapted to receive a series of needles, a rotating cam-ring provided with a movable drawing-down cam, an annular raceway entirely surrounding said cam-ring and having a smooth level top, means between the said raceway and drawing-down cam to actuate the latter according to the changing positions of the raceway, a pattern-surface, and intermediate connections between it and the said raceway to automatically move the same, and thereby effect the regulation of the length of the stitches, substantially as described.

28. In a knitting-machine, a raceway made as a smooth-topped ring having supports whereby the raceway may be moved vertically as it is partially rotated, as described, combined with a pattern-surface, a monitor-lever, and adjustable connections between it and the said raceway, to operate substantially as described.

29. A knitting-machine containing the following instrumentalities, viz: a needle-bed grooved for the reception of needles, a surrounding cam-ring having knitting and non-knitting grooves and right and left hand guiding-gates, a directing-cam located between said guiding-gates, a gate-controlling cam located outside the said cam-ring and made movable with it in its reciprocations and rotations, devices intermediate the said cam-ring and the said guiding-gates, a yoke connected with the hub of the said cam, a controller and two rings having each a tripping-pin, and means to automatically move it to put the said controller into position to enable the said cam to be put into operative position or to be put out of operative position with relation to the said tripping-pins, substantially as described.

30. In a knitting-machine, the combination, with a conically-shaped needle-bed having grooves for the reception of a series of needles, of a thread-support and latch-guard located above the smaller end of the said bed in proximity to the hooks of the needles, the said combined support and latch-guard receiving the thread upon its outer surface and delivering it to the needles, substantially as described.

31. In a knitting-machine, a conically-shaped needle-bed, in combination with a latch-guard suspended over the needles and a thread-guide adapted to direct the thread onto the outside of the latch-guard, the latter having a suitable projection to prevent the thread slipping above it, substantially as described.

32. In a knitting-machine, a conical needle-bed and a latch-guard suspended above it to surround the upper ends of the needles, the said guard having a suitable support, combined with an independent thread-guide adjustably connected to the cam-ring, substantially as described.

33. The combination, in a knitting-machine, with a conical needle-bed, a cam-ring, and a series of needles projecting above the said needle-bed, of a thread-guide and means interposed between the said thread-guide and the said needles to prevent the contact of the thread between the knitting-point and the thread-guide with the needles when rotating the machine and the said needles are not knitting, substantially as described.

34. In a knitting-machine, a needle-bed having projections to serve as a rim or support for a sinker-actuating cam, said needle-bed being grooved for the reception of a series of needles and slotted through at its upper end, as at $A^4$, between adjacent needle-grooves for the reception and guidance of a series of sinkers, said needle-bed being also provided with an annular groove $A^8$, located between the said rim or support and the upper end of the said cylinder and intersecting the said sinker-slots, combined with a series of sinkers and a pivotal wire $A^9$, placed in said annular groove to constitute fulcra for the series of sinkers, substantially as described.

35. In a knitting-machine, a cam-cylinder, two freely-movable rings having tripping-pins supported by the said cylinder, and two stop rings or racks mounted on the bed-plate of the machine, each ring or rack having gear-teeth and being provided with adjustable stops, between which are received the said tripping-pins, combined with pinions to move the said rings or racks, to operate substantially as described.

36. In a knitting-machine, a cam-cylinder, two freely-movable rings having tripping-pins supported by the said cylinder, and two stop-rings or racks mounted on the bed-plate of the machine, each ring or rack having gear-teeth and being provided with adjustable stops, between which are received the said tripping-pins, combined with pinions to move the said rings or racks and with means, substantially as described, to intermittingly operate the said pinions, to operate substantially as described.

37. In a knitting-machine, a cam-cylinder, two freely-movable rings $b$ $b'$, having tripping-pins supported by the said cylinder, and two stop rings or racks mounted on the bed-plate of the machine outside the said rings $b$ $b'$, each ring or rack having gear-teeth and being provided with adjustable stops, between which are received the said tripping-pins, combined with pinions to move the said rings or rack, means, substantially as described, to intermittingly operate the said pinions, and locking devices for the said pinions, to operate substantially as described.

38. In a knitting-machine, a stop ring or rack having teeth, a movable ring, as $b'$, having a tripping-pin $b^3$ and a pinion to actuate the same, and a change-wheel carried by the said pinion, combined with a reciprocating frame having two pawls and with means to reciprocate the said frame, to operate substantially as described.

39. In a knitting-machine, a stop ring or rack having teeth and a pinion to actuate the same, and a change-wheel carried by the said pinion, combined with a reciprocating frame having two pawls, means to reciprocate the said frame, and devices to control the position of the said frame to enable one or the other of its pawls to engage the change-wheel, to operate substantially as described.

40. In a knitting-machine, a stop ring or rack having teeth and a pinion to actuate the same, and a change-wheel carried by the said pinion, combined with a reciprocating frame having two pawls, means to reciprocate the said frame, and means to change the position of the said frame to enable one or the other of its pawls to actuate the change-wheel or keep both pawls from engagement with the change-wheel, substantially as described.

41. In a knitting-machine, a stop ring or rack having teeth, a pinion to actuate the same, a movable ring, as $b'$, having a tripping-pin, as $b^3$, and a change-wheel carried by the said pinion, combined with a reciprocating frame having two pawls, means to reciprocate the said frame, and a locking rod or bar to engage and lock the change-wheel, substantially as described.

42. In a knitting machine, the shaft $h^{12}$, having a pinion $k^7$, means to both reciprocate and rotate the said shaft, gears $k^8\ k^9$ in engagement with the gear $k^7$, and cams $k^{16}\ k^{18}$, combined with pawl-carrying frames actuated by the said cams and pinions, stop rings or racks, and change-gears, to operate substantially as described.

43. In a knitting-machine, the combination, with a pair of reciprocating frames having pawls and slotted as described, of the eccentrics, their attached gears, a double quadrant, a pattern-surface, and intermediate connections whereby the said quadrant may be moved to rotate the said gears and eccentrics and move the pawl-carrying frames, so that one or the other of their pawls may be in operative position, substantially as described.

44. In a knitting-machine, the reciprocating pawl-frame, its actuating-cam, and the leg depending from the pawl-frame and provided with a projection, combined with a stilt to keep the pawl-frame elevated at desired times, substantially as described.

45. The shaft $h^{12}$, its gear $B^3$ and pinion $h^{10}$, and gear-wheel $h^3$, provided with a reciprocating plate having a locking-stud, combined with shaft $e^7$, its attached notched disk, means to rotate the shaft, a vibrator mounted loosely on the said shaft and having a notch, means to actuate the said vibrator, and means to move the said plate and compel the coupling-pin to rest in the notch of the disk in order that the said disk may assume control of and rotate the said gear and shaft $h^{12}$, substantially as described.

46. The shaft $h^{12}$, its gear $B^3$ and pinion $h^{10}$, and gear-wheel $h^3$, provided with a reciprocating plate having a locking-stud, combined with shaft $e^7$, its attached notched disk, means to rotate the shaft, a vibrator mounted loosely on the said shaft and having a notch, means to actuate the said vibrator, and means to move the said plate in a direction to cause the coupling-pin to engage the notch in the said vibrator in order that it may assume control of the said gear-wheel and effect the oscillations of the said shaft $h^{12}$, substantially as described.

47. In a knitting-machine, the main rotating shaft $e^7$, a notched disk fixed thereto, a vibrator provided with a notch and mounted loosely with relation to the said shaft, means to actuate the vibrator, a gear-wheel mounted loosely on the said shaft, a second shaft having a pinion in mesh with the said gear-wheel, a guide-plate mounted in the said gear-wheel and made movable diametrically in connection therewith, a coupling-pin carried by the said guide-plate, the latter having at one end a projection extended outside the said gear-wheel, and a spring connected with the said guide-plate, combined with a movable brake and means to actuate it to control the engagement of the said coupling-pin with either the notch in the said disk or in the said vibrator, substantially as described.

48. The shaft $e^7$, provided with a notched disk, a gear-wheel loosely mounted on the said shaft and provided with a diametrically-sliding guide-plate having a coupling-pin and a roller or projection at or near its end opposite the coupling-pin, a shaft and a pinion thereon with which the said gear-wheel is in engagement, and a vibrator having a notch and provided with a spring-held locking-dog, combined with a shoe and with means to move the vibrator and to rotate the shaft having the notched disk, the shoe acting through the guide-plate to retain the coupling-pin in the notch of the vibrator, substantially as described.

49. In a knitting-machine, a power-shaft having a tight and two loose pulleys, and a belt-shifter adapted to control two belts, combined with a pattern or monitor chain, a monitor-lever, and connections intermediate the monitor-lever and the belt-shifter to automatically determine which of the two belts shall be put upon the tight pulley, according to whether the cam-ring is to be rotated or reciprocated, substantially as described.

50. In a knitting-machine, the shaft $e^8$ and shoe controlled thereby to effect the change from rotating or circular knitting to reciprocating knitting, the belt-shipper controlling the driving-belts, a monitor-lever $f^2$, connections between it and the belt-shipper, a toe 13 on the said monitor-lever, and a monitor-lever $f$, having a toe, combined with a monitor-chain whereby the belt-shipper is actuated at a slight period of time in advance of the rocking of the shaft $e^8$, as and for the purposes set forth.

51. In a knitting-machine, the following instrumentalities, viz: a stationary needle-bed, a series of needles therein, a rotating cam-ring having a movable drawing-down cam, a surrounding annular raceway having a smooth top or upper surface all around said ring, actuating devices between the said raceway and the said drawing-down cam, inclined supports for the said raceway, and a pattern-surface, combined with intermediate devices, substantially as described, and actuating means therefor, whereby the said raceway may be moved for the production of a slack course at times determined upon by the pattern-surface, substantially as described.

52. In a knitting-machine, the following instrumentalities, viz: a needle-bed containing a series of needles, a cam-ring having cams to reciprocate the same, a yarn-guide, and rolls between which the yarn being knitted is passed, the said yarn serving to rotate the said rolls to thereby feed a supplemental thread, substantially as described.

53. In a knitting-machine, a thread-feeding attachment containing a pair of rolls, two yarn-arms located above said rolls, and means to change their relative positions to put the yarn carried by either of said yarn-arms between the said rolls to be held thereby, substantially as described.

54. In a knitting-machine, a thread-feeding attachment containing a pair of rolls, two yarn-arms located above said rolls, and means to change the relative positions of said yarn-arms to place that one of the said yarns going to the needles out of contact with the said rolls and leave the end of the yarn not then used in knitting between and held by the said rolls, substantially as described.

55. In a knitting-machine, a shaft having yarn-passages and two yarn-arms, each having a yarn-passage for a distinct and separate yarn, combined with means to rotate the said shaft and yarn-arms, substantially as described.

56. In a knitting-machine, a shaft having yarn-passages and two yarn-arms, each having a yarn-passage for a distinct and separate yarn, combined with holding-rolls, means to rotate the said shaft and yarn-arms, and means to move one of the said yarn-arms to take its yarn away from the rolls referred to, the other yarn-arm being positively brought into position to have its thread held by the said rolls, substantially as described.

57. In a knitting-machine, the combination, with rolls between which the thread is passed on its way to the yarn-guide, of cutting mechanism located between the said rolls and the usual yarn-guide to sever the thread below the rolls, substantially as described.

58. A needle-bed, a cam-ring, a yarn-guide mounted on the cam-ring, a pair of rolls located above the said yarn-guide, two yarn-arms located above the said rolls, a support for the yarn-arms, means to actuate the said yarn-arms to place one of the yarns outside of and the other between the bight of the said rolls, and a thread-cutter, to operate substantially as described.

59. In a knitting-machine, a thread-feeding device and a pair of rolls between which the yarn is held, combined with a pair of shears and with an arrow-pointed cam $p^2$ to close said shears, substantially as described.

60. In a knitting-machine, a thread-feeding device and a pair of rolls between which the yarn is held, combined with a pair of shears and with a suitable cam $p^3$ to co-operate with the said shears, substantially as described.

61. In a knitting-machine, a thread-feeding device and a pair of rolls between which the yarn is held, combined with a pair of shears and with two arrow-pointed cams to co-operate with the said shears, substantially as described.

62. In a knitting-machine, the following instrumentalities, viz: a needle-bed, a series of needles therein, a cam-ring to reciprocate the said needles, a yarn-guide, two vibratable yarn-arms, each provided with a yarn, a pair of rolls to engage and hold both the said yarns between the yarn-guide and yarn-arms, and means to effect the twisting of the said yarns between the said rolls and yarn-arms, substantially as described.

63. In a knitting-machine, the following instrumentalities, viz: a rotating shaft, as $e^7$, provided with a notched disk fixed thereto, a gear-wheel, as $h^3$, loose on the said shaft, a guide-plate carried by said gear-wheel and provided with a coupling-pin, a shaft $h^{12}$, having a pinion engaged constantly by the said gear-wheel, said shaft being provided with a bevel-gear, a needle-bed, a cam-ring having teeth in engagement with the teeth of the said bevel-gear, a vibrator loose on said shaft $e^7$ and having a notch, gearing and connections between said shaft $e^7$ and the said vibrator to reciprocate the same as the shaft is rotated, and a device to slide the said plate in the said gear-wheel to cause the said coupling-pin to engage either the notch in the said disk or the notch in the said vibrator to thereby enable the said disk or the said vibrator to assume control of and move the said gear-wheel, according as it is desired to rotate or reciprocate the said cam-ring, substantially as described.

64. A knitting-machine containing the following instrumentalities, viz: a needle-bed, a series of needles therein, a cam-ring having cams to actuate the said needles, a yarn-guide to present yarn to the needles, two guide-arms, each provided with a yarn, and a pair of rolls located between said guide-arms and the yarn-guide, the said rolls receiving at times both yarns between their bight and aiding one yarn to carry the other with it toward the needles and at other times to hold the end of but one of the said yarns—viz., the one not engaged in the fabric at the needles, substantially as described.

65. A knitting-machine containing the following instrumentalities, viz: a needle-bed, a series of needles therein, a cam-ring having cams to actuate the said needles, a yarn-guide to present yarn to the needles, two guide-arms, each provided with a yarn, and a pair of rolls located between said guide-arms and the yarn-guide, the said rolls receiving at times both yarns between their bight and aiding one yarn to carry the other with it toward the needles and at other times to hold the end of but one of the said yarns—viz., the one not engaged in the fabric at the needles—means to twist together the said yarns between the said yarn-arms and rolls, and thread-cutting mechanism located and made operative below said rolls and between them and the yarn-guide to sever one or the other of the said yarns, according to which one is not then to be engaged by the needles, substantially as described.

66. The hollow shaft $N'$, the thread-arms $O^9$ $P^9$, pivoted thereon, and the gear $M'$, combined with means to rotate the said shaft in one and then in an opposite direction and to vibrate the said thread-arms, substantially as described.

67. The rolls $B^\times$ and the hollow yarn-guiding shaft $N'$, adapted to guide and keep separated two yarns, the center of rotation of said shaft being substantially in line with the bight of said rolls, combined with two thread-arms and with means to impart rotary reciprocatory movement to said shaft and to vibrate the said thread-arms, substantially as described.

68. The shaft $K'$, its attached pinion, the rack and means to reciprocate it, and the segment-arm $L'$, combined with the gear $M'$, the connected hollow yarn-guiding shaft, its pivoted arms, and the rolls, to operate substantially as described.

69. The take-up and a rotating shaft having passages for the yarns, combined with a series of jointed guides interposed between them, substantially as described.

70. The take-up lever provided with a quadrant at its rear end, combined with a spring adapted to be adjustably secured at different points of the quadrant, to operate substantially as described.

71. In a knitting-machine, a needle-bed having a series of stationary seats, combined with a series of sinkers having their bearings when the stitch is being drawn on the said seats and means to actuate the said sinkers, substantially as described.

72. In a knitting-machine, the combination, with rolls between which the thread is passed on its way to the yarn-guide, of yarn-arms and means to move them and hold their yarns out of contact with the said rolls, as when both the yarns are to be fed to the needles, one yarn reinforcing the other, substantially as described.

73. In a reversible knitting-machine, a needle-bed adapted to receive and guide a series of needles and a needle-actuating cam ring or plate having a knitting-groove and a non-knitting groove on a level extended all around the upper edge of the said ring and adapted to receive the butts of the said needles and maintain them in correct position not only for all-around or circular work, as well as when narrowing and widening, as described, but also for topping, combined with mechanism to depress from the said level into the knitting-groove and elevate from said knitting-groove back into the said level all the said needles in succession for all-around work or any number of said needles less than the whole number, as may be required for heel and toe knitting, substantially as described.

74. In a knitting-machine, a bed for the needles, a series of needles therein, a cam-ring to actuate the needles, a series of seats stationary with relation to the cam-ring, and a sinker-actuating cam, combined with a series of sinkers the breasts of which are drawn in a curve struck from the point of contact of the end of the sinker with the said seats at the time that the needles are drawing their loops about the breasts of the sinkers below their hooks, substantially as described.

75. A knitting-machine containing the following instrumentalities, viz: a bed-plate having an opening, a conical needle-bed having a shank to fit said opening, a narrow cone-shaped cam-ring having a series of cams, substantially as described, a yarn-guide, and a yarn-rest interposed between said yarn-guide and needles to receive the yarn and prevent it from sliding on the needles not being reciprocated to form loops, whereby conical beds of various lengths may be used in connection with the same cam-ring, according to the diameter of the tube to be knitted, substantially as described.

76. In a knitting-machine, the combination, with a needle-bed for roundabout or circular knitting, said needle-bed being grooved for the reception of a series of needles, the upper end of the bed being provided with a series of slots in line with the dividing-walls of the needle-grooves and adapted to receive and guide a series of sinkers, of a series of sinkers having their fulcra between the upper and lower ends of the said sinker-grooves, a series of needles, a cam-ring to actuate the said sinkers, and a ring having cams to reciprocate the said needles, for the purposes set forth.

Montreal, October 6, 1891.

ROBT. W. KING.

In presence of—
W. J. WALKER,
MAGGIE MCLAUGHLIN.